US012652572B2

(12) United States Patent
Nasrallah et al.

(10) Patent No.: US 12,652,572 B2
(45) Date of Patent: Jun. 9, 2026

(54) DYNAMIC QUALITY OF SERVICE TAGGING ON TRANSPORT LAYER

(71) Applicant: Dell Products L.P., Round Rock, TX (US)

(72) Inventors: Mohamed Nasrallah, Nasr City (EG); Engy Fawaz, New Cairo (EG); Marwan Mansour, Alexandria (EG)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 18/484,141

(22) Filed: Oct. 10, 2023

(65) Prior Publication Data

US 2025/0119786 A1 Apr. 10, 2025

(51) Int. Cl.
*H04W 28/02* (2009.01)
*H04W 28/24* (2009.01)

(52) U.S. Cl.
CPC ... *H04W 28/0268* (2013.01); *H04W 28/0278* (2013.01); *H04W 28/24* (2013.01)

(58) Field of Classification Search
CPC ... H04L 43/087; H04L 47/28; H04L 47/2458; H04L 43/50; H04W 28/0268; H04W 28/0278; H04W 28/24
See application file for complete search history.

(56) References Cited

U.S. PATENT DOCUMENTS

| | | | | |
|---|---|---|---|---|
| 2011/0051731 A1* | 3/2011 | Mang | ................. | H04L 47/2458 |
| | | | | 370/395.21 |
| 2012/0236713 A1 | 9/2012 | Kakadia et al. | | |
| 2014/0355427 A1 | 12/2014 | Cheng | | |
| 2018/0115927 A1* | 4/2018 | Vesterinen | ........ | H04W 36/0072 |
| 2018/0167294 A1* | 6/2018 | Gupta | .................. | H04L 43/087 |
| 2019/0281492 A1 | 9/2019 | Hans | | |
| 2021/0336889 A1* | 10/2021 | Yaswi | ................. | H04L 41/0895 |

(Continued)

OTHER PUBLICATIONS

K. Hedayat et al., "A Two-Way Active Measurement Protocol (TWAMP) (RFC5357)", IS RFC 2019 (Year: 2019).*

(Continued)

*Primary Examiner* — Omer S Mian
(74) *Attorney, Agent, or Firm* — Amin, Turocy & Watson, LLP

(57) ABSTRACT

Enhanced tag management of QoS tags associated with services can be performed. Network monitor component (NMC) can send test signals to network equipment to trigger sending of test messages and test response messages associated with tags between network equipment. NMC can receive performance indicator information from network equipment based on network responses associated with tags to test messages. NMC can analyze the performance indicator information, service specifications associated with services, original QoS tag information, and current QoS tag information to determine which services are or can be satisfied at which tags, and determine whether adjustments to assignments of tags are to be performed. Based on analysis results, NMC can promote a service from its original tag to a higher tag, demote a service from a higher tag to its original tag, and/or temporarily ban a service from being promoted from its original tags to a higher tag.

20 Claims, 10 Drawing Sheets

(56) References Cited

U.S. PATENT DOCUMENTS

2025/0071065 A1    2/2025  Lal

OTHER PUBLICATIONS

T Mizrahi et al., "An Overview of Operations, Administration, and Maintenance (OAM) Tools", IS RFC, 2019 (Year: 2019).*

"Towards Centralized Performance Monitoring in 5G Networks" Creanord, Jan. 25, 2023, [https://creanord.com/story/towards-centralized-performance-monitoring-in-5g-networks/], retrieved Oct. 10, 2023, 5 pages.

Office Action mailed May 7, 2025 for U.S. Appl. No. 18/441,732, 48 pages.

Nasrallah et al. "Predictive and Enhanced Dynamic Quality of Service Tagging on Transport Layer" U.S. Appl. No. 18/441,732, filed Feb. 14, 2024, 133 pages.

Office Action mailed Nov. 14, 2025 for U.S. Appl. No. 18/441,732, 46 pages.

Notice of Allowance mailed Feb. 5, 2026 for U.S. Appl. No. 18/441,732, 76 pages.

* cited by examiner

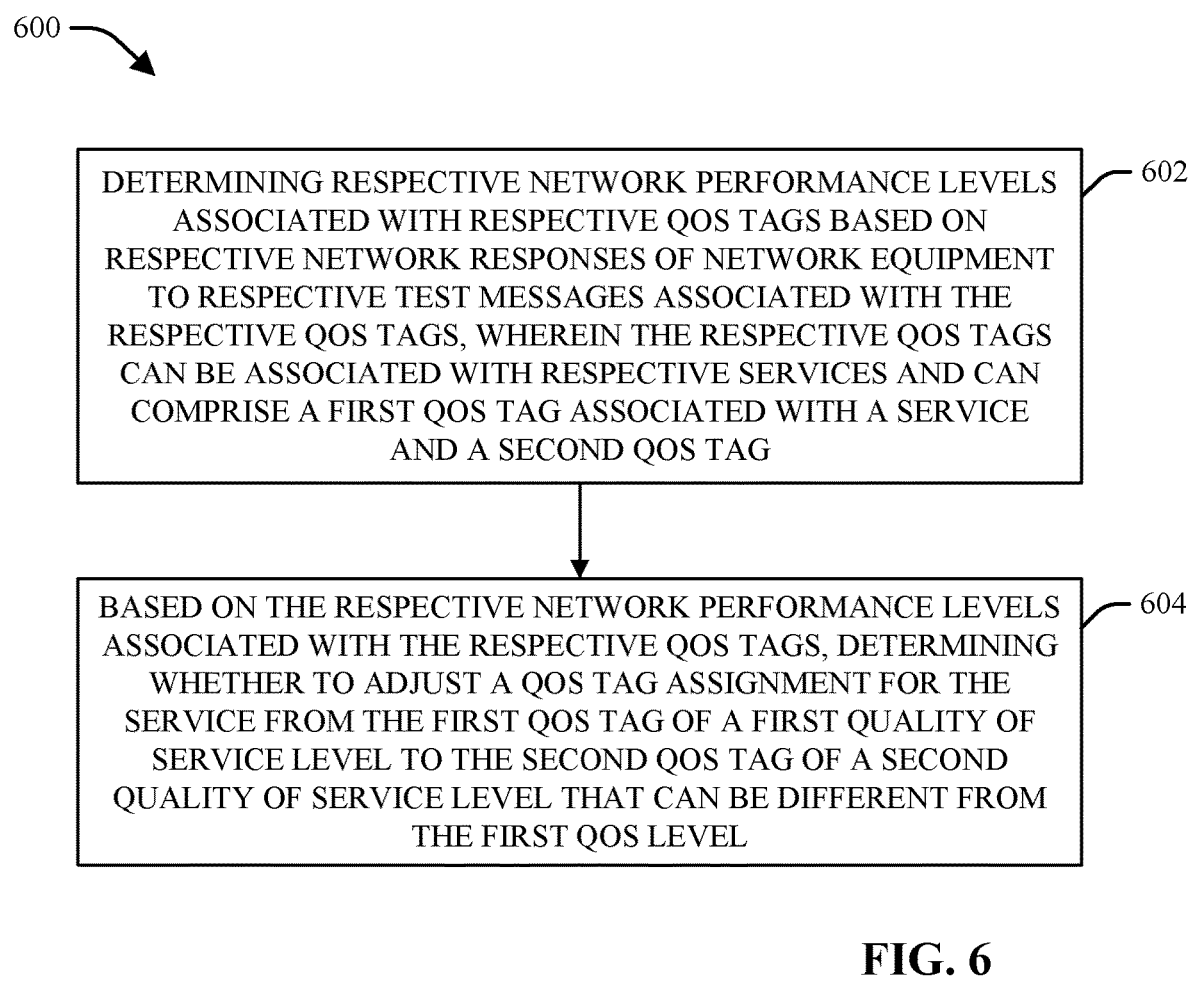

600 ⟍

┌─────────────────────────────────────────────────────────┐  ⟋ 602
│  DETERMINING RESPECTIVE NETWORK PERFORMANCE LEVELS        │
│     ASSOCIATED WITH RESPECTIVE QOS TAGS BASED ON          │
│  RESPECTIVE NETWORK RESPONSES OF NETWORK EQUIPMENT        │
│    TO RESPECTIVE TEST MESSAGES ASSOCIATED WITH THE        │
│  RESPECTIVE QOS TAGS, WHEREIN THE RESPECTIVE QOS TAGS     │
│   CAN BE ASSOCIATED WITH RESPECTIVE SERVICES AND CAN      │
│    COMPRISE A FIRST QOS TAG ASSOCIATED WITH A SERVICE     │
│                AND A SECOND QOS TAG                       │
└─────────────────────────────────────────────────────────┘

┌─────────────────────────────────────────────────────────┐  ⟋ 604
│  BASED ON THE RESPECTIVE NETWORK PERFORMANCE LEVELS       │
│  ASSOCIATED WITH THE RESPECTIVE QOS TAGS, DETERMINING     │
│    WHETHER TO ADJUST A QOS TAG ASSIGNMENT FOR THE         │
│   SERVICE FROM THE FIRST QOS TAG OF A FIRST QUALITY OF    │
│     SERVICE LEVEL TO THE SECOND QOS TAG OF A SECOND       │
│  QUALITY OF SERVICE LEVEL THAT CAN BE DIFFERENT FROM      │
│                 THE FIRST QOS LEVEL                       │
└─────────────────────────────────────────────────────────┘

FIG. 6

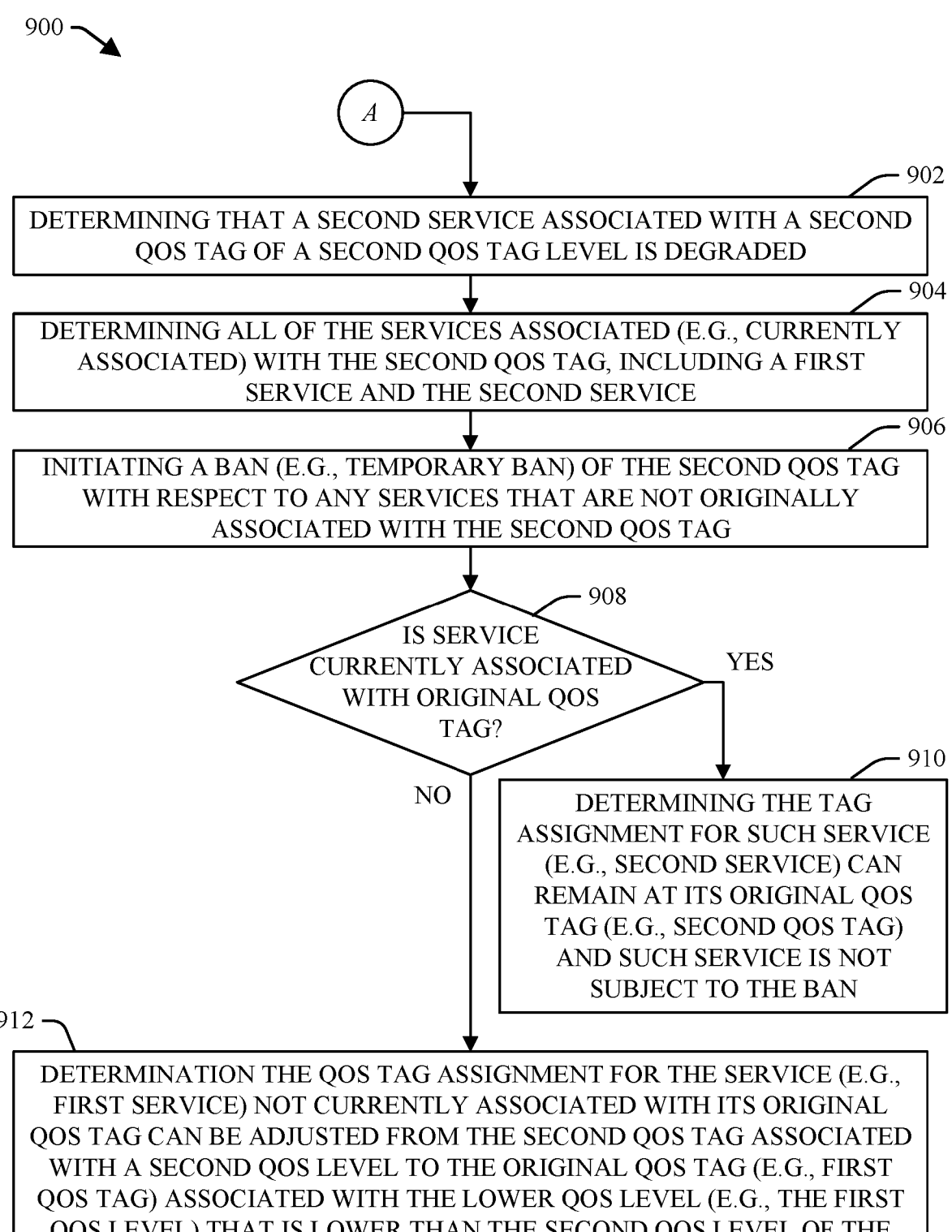

900

A

902
DETERMINING THAT A SECOND SERVICE ASSOCIATED WITH A SECOND QOS TAG OF A SECOND QOS TAG LEVEL IS DEGRADED

904
DETERMINING ALL OF THE SERVICES ASSOCIATED (E.G., CURRENTLY ASSOCIATED) WITH THE SECOND QOS TAG, INCLUDING A FIRST SERVICE AND THE SECOND SERVICE

906
INITIATING A BAN (E.G., TEMPORARY BAN) OF THE SECOND QOS TAG WITH RESPECT TO ANY SERVICES THAT ARE NOT ORIGINALLY ASSOCIATED WITH THE SECOND QOS TAG

908
IS SERVICE CURRENTLY ASSOCIATED WITH ORIGINAL QOS TAG?

YES

NO

910
DETERMINING THE TAG ASSIGNMENT FOR SUCH SERVICE (E.G., SECOND SERVICE) CAN REMAIN AT ITS ORIGINAL QOS TAG (E.G., SECOND QOS TAG) AND SUCH SERVICE IS NOT SUBJECT TO THE BAN

912
DETERMINATION THE QOS TAG ASSIGNMENT FOR THE SERVICE (E.G., FIRST SERVICE) NOT CURRENTLY ASSOCIATED WITH ITS ORIGINAL QOS TAG CAN BE ADJUSTED FROM THE SECOND QOS TAG ASSOCIATED WITH A SECOND QOS LEVEL TO THE ORIGINAL QOS TAG (E.G., FIRST QOS TAG) ASSOCIATED WITH THE LOWER QOS LEVEL (E.G., THE FIRST QOS LEVEL) THAT IS LOWER THAN THE SECOND QOS LEVEL OF THE SECOND QOS TAG

FIG. 9

DYNAMIC QUALITY OF SERVICE TAGGING ON TRANSPORT LAYER

BACKGROUND

Network providers can utilize different tags, such as quality of service (QoS) tags, which can be associated with different services and associated data, to set different priorities for the services and associated data in connection with communication of such data to or from a core network and base stations. For instance, QoS tags can be utilized by network providers to set different priorities for the services and associated data based on the latency or packet drop sensitivity associated with the services, and handle network congestion on communication links between base stations and the core network.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising a processor, respective network performance levels associated with respective quality of service tags based on respective network responses of network equipment to respective test messages associated with the respective quality of service tags, wherein the respective quality of service tags can be associated with respective services and can comprise a first quality of service tag associated with a service and a second quality of service tag. The method also can include: based on the respective network performance levels associated with the respective quality of service tags, determining, by the system, whether to adjust a quality of service tag assignment for the service from the first quality of service tag of a first quality of service level to the second quality of service tag of a second quality of service level that can be different from the first quality of service level.

In certain embodiments, the disclosed subject matter can comprise a system that can comprise a memory that can store computer executable components, and a processor that can execute computer executable components stored in the memory. The computer executable components can comprise a monitor component that can determine respective groups of performance indicators associated with respective quality of service tags based on respective network responses of network equipment associated with a core network to respective messages associated with the respective quality of service tags, wherein the respective quality of service tags can be associated with respective services and can comprise a first quality of service tag associated with a service and a second quality of service tag. The computer executable components also can comprise a tag manager component that, based on the respective groups of performance indicators associated with the respective quality of service tags, can determine whether to modify a tag assignment for the service from the first quality of service tag of a first quality of service level to the second quality of service tag of a second quality of service level that can be distinct from the first quality of service level.

In still other embodiments, the disclosed subject matter can comprise a non-transitory machine-readable medium, comprising executable instructions that, when executed by a processor, can facilitate performance of operations. The operations can comprise determining respective groups of performance indicators associated with respective quality of service tags based on respective network responses of network equipment to respective messages associated with the respective quality of service tags, wherein the respective quality of service tags can be associated with respective services and can comprise a first quality of service tag associated with a service and a second quality of service tag. The operations also can comprise: based on the respective groups of performance indicators associated with the respective quality of service tags, determining whether to alter a tag assignment for the service from the first quality of service tag of a first quality of service level to the second quality of service tag of a second quality of service level.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

BRIEF DESCRIPTION OF THE DRAWINGS

FIG. 6 illustrates a flow chart of an example method that can desirably manage QoS tagging associated with services, in accordance with various aspects and embodiments of the disclosed subject matter.

FIG. 9 depicts a flow chart of an example method that can desirably manage QoS tagging associated with services, including managing adjustment of a QoS tag assignment associated with a service(s), including determining whether to demote the service(s) to its lower original QoS tag from a higher and/or promoted QoS tag, and temporarily ban the service(s) from having its QoS tag assignment changed from the original lower QoS tag to the higher and/or promoted QoS tag, in accordance with various aspects and embodiments of the disclosed subject matter.

DETAILED DESCRIPTION

Figure 1:
FIG. 1 illustrates a block diagram of a non-limiting example system that can desirably manage and perform quality of service (QOS) tagging associated with services, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to managing and performing dynamic quality of service (QOS) tagging on a transport layer of a communication network. The transport layer can refer, or relate, to connectivity (e.g., fiber, microwave, copper, or other type of connectivity) between a core network and a base station. Network providers can utilize different tags, such as QoS tags, which can be associated with different services and associated data, to set different priorities for the services and associated data in connection with communication of such data to or from a core network and base stations of a communication network. For instance, QoS tags can be utilized by network providers to set different priorities for the services and associated data based on the latency or packet drop sensitivity associated with the services, and handle network congestion on communication links between the base stations and the core network.

With existing tagging techniques, QoS tagging can be static utilizing, for example, a static QoS tagging table, where the tags applied to services and associated data can be static, as indicated by the entries (e.g., data or tagging entries) of the static QoS tagging table. For example, network providers typically can have personnel who manually set different priorities for different services and can generate a static QoS tagging table that can indicate different tags that can indicate the different priorities of the different services, and the different tags can be applied to the different data of the different services, in accordance with the static QoS tagging table.

For instance, with regard to a downlink data communication, the core network can add a QoS tag to data packets associated with a service where the tag can be determined by the core network based on the tag entries in a pre-defined static QoS tagging table. For uplink data communication, a base station can add a QoS tag to data packets associated with a service where the tag can be determined by the base station based on the tag entries in a pre-defined static QoS tagging table. On sending the data packets via the transport layer, bandwidth on the links between the base station and the core network can be distributed across different services according to their respective priority defined within the pre-defined static QoS tagging table. This can be static regardless of any varying congestion on services and service level agreement (SLA) satisfaction.

This can lead to undesirable (e.g., unwanted, unsuitable, or inefficient) inflexibility to adapt to different traffic patterns (e.g., peak or busy hour(s)) that can occur in the communication network with respect to the base stations and the core network. For instance, such existing tagging techniques can result in inefficient utilization of transport layer resources as the network may be unable to adapt the utilization of the transport layer, within the available resources, in times of varying traffic patterns, where data traffic for different services can vary over time; can result in degradation in QoS and quality of experience (QoE) of user equipment (UE) utilizing the services; can result in failure to satisfy (e.g., failure to meet or exceed) SLAs across different data traffic patterns on the transport layer; and/or can result in an inability to react to unexpected data traffic congestion and spikes in the communication network at the time of occurrence.

Another problem with existing tagging techniques can be that, typically, the same QoS tagging can be configured for multiple base stations and/or the core network, which can be undesirable (e.g., unwanted, unsuitable, inefficient, and/or suboptimal) for multi-vendor deployments. Also, re-adjustment (e.g., manually re-adjustment) of static QoS tagging by network providers due to traffic behavior can be prone to an undesirable amount of operational time passing while waiting for such re-adjusting of QoS tagging to be performed. For instance, typically in the case of detecting traffic congestion or SLA degradation by a network provider(s), the network provider(s) can have personnel re-define the QoS tagging table offline and roll out a re-defined static QoS tagging table(s) to groups of core networks and base stations after some significant (e.g., undesirable and remarkable) amount of lead time.

The disclosed subject matter can address and overcome these and other deficiencies of existing techniques with regard to QoS tagging. In that regard, it can be desirable (e.g., wanted, advantageous, beneficial, or optimal) to have QoS tagging for services be dynamic and automatically adaptable to varying conditions and data traffic patterns of the communication network to enable more efficient utilization of resources (e.g., transport layer resources and/or other resources) of the communication network across varying conditions and data traffic patterns of the communication network, mitigate degradation of services, reduce SLA violations associated with services, and/or apply (e.g., automatically, dynamically, and/or adaptively apply) respective QoS tagging for respective services for respective base stations and respective core networks.

The disclosed subject matter can employ enhanced QoS tagging techniques that can desirably (e.g., advantageously, beneficially, enhancedly, or optimally) have QoS tagging for services be dynamic and automatically adaptable to varying conditions and data traffic patterns of the communication network to enable more efficient utilization of resources of the communication network across varying conditions and data traffic patterns of the communication network, mitigate degradation of services, reduce or minimize SLA violations associated with services, and/or apply (e.g., dynamically and/or adaptively apply) respective QoS tagging for respective services for respective base stations and respective core networks, among other benefits.

To that end, techniques that can desirably (e.g., automatically, dynamically, suitably, reliably, efficiently, enhancedly, and/or optimally) manage and perform enhanced QoS tagging for services are presented. A system can comprise a network monitor component that can be associated with (e.g., communicatively connected to) one or more core networks and one or more base stations, wherein a core network can be associated with one or more base stations.

With regard to a core network associated with a base station, the network monitor component can communicate respective test signals (e.g., two-way active measurement protocol (TWAMP) signals or other type of test signals) associated with respective QoS tags and/or respective services to the core network and/or the base station to initiate or trigger testing of network responses to test messages associated with the respective QoS tags and/or the respective services.

In response to the respective test signals, the core network and/or base station can exchange the respective test messages and respective test response messages associated with the respective QoS tags and/or the respective services. The core network and/or base station can determine or measure respective performance indicators associated with the respective QoS tags and/or the respective services, based at least in part on the respective network responses with respect to the respective test messages and the respective test response messages. The core network and/or base station can communicate respective performance indicator information relating to the respective QoS tags and/or the respective services to the network monitor component.

The network monitor component can analyze the respective performance indicator information, respective service specifications (e.g., SLAs) associated with the respective services, original QoS tag information, and current QoS tag information to determine which services are or can be satisfied at which QoS tags, and determine whether adjustments to assignments of QoS tags to services are to be performed. The original QoS tag information (e.g., original QoS tag table) can indicate respective original QoS tags that originally or previously (e.g., on a long term basis) have been assigned to the respective services. The current QoS tag information (e.g., current QoS tag table) can indicate respective current QoS tags that currently are assigned to the respective services, wherein some of the current QoS tags may be original QoS tags and/or some of the other current QoS tags may be promoted (e.g., higher) QoS tags that have been temporarily assigned to certain relatively lower priority services. In certain embodiments, the network monitor component can determine service performance information (e.g., service performance table) that can indicate which of the respective services are or can be satisfied at the respective QoS tags based at least in part on the results of analyzing the respective performance indicator information and the respective service specifications associated with the respective services with respect to the respective QoS tags, such as described herein.

Based at least in part on the results of the analysis of the current QoS tag information, the original QoS tag information, and the service performance information, the network monitor component can perform (e.g., automatically or dynamically perform) one or more tag management actions, which can comprise promoting (e.g., temporarily promoting) a service from a lower (e.g., its original lower) QoS tag to a higher QoS tag, demoting a service from a higher QoS tag to its original lower QoS tag, and/or temporarily banning a service from being promoted from a lower (e.g., its original lower) QoS tag to a higher QoS tag, or can determine that no adjustment to an assignment of a QoS tag to a service is to be performed at that particular time, in accordance with defined tag management criteria, such as more fully described herein.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, efficiently, reliably, suitably, enhancedly, or optimally) manage and perform QoS tagging associated with services, in accordance with various aspects and embodiments of the disclosed subject matter. The system 100 can comprise a communication network 102 that can comprise a core network 104 and one or more base stations, including base station 106, that can be associated with (e.g., communicatively connected to) the core network 104. The core network 104 and the one or more base stations (e.g., base station 106) can facilitate (e.g., enable) wireless communication of data (e.g., voice or other audio data, video data, textual data, or other data) between devices (e.g., communication devices or UEs), such as devices associated with the core network 104, via the one or more base stations, and other devices associated with the core network 104 or, more generally, the communication network 102 (e.g., a device, such as a server or computer, can be connected to the communication network 102 via a wireline connection or via a network other than the core network 104).

The devices can comprise, for example, devices 108, 110, and/or 112. A device (e.g., 108, 110, or 112) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device 108 can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the base station 106 can be a 5G or other NR base station (e.g., gNB or other NR-type or xG base station, wherein x can be a number greater than 5). In certain embodiments, the core network 104 can comprise a UPF node, an access and mobility management function (AMF) node, and/or other network functions. The UPF node can connect to or interface with the one or more base stations (e.g., base station 106), can be an interconnect point between the core network and a data network (DN), can provide or facilitate providing a protocol data unit (PDU) session anchor point for providing mobility associated with radio access technologies (RATs), can provide or facilitate providing data packet routing or forwarding, and/or can perform or manage other functions. The AMF node can be a control plane function that can manage registration and deregistration of devices (e.g., devices 108, 110, and/or 112) with the core network 104, manage connections of devices with the core network 104, manage mobility associated with devices (e.g., maintain knowledge of locations of devices, update locations of devices), and/or manage or perform other functions. In accordance with various other embodiments, the base station 106 can be a 4$^{th}$ generation (4G) long term evolution (LTE) base station, or the base station 106 can comprise 4G LTE technology and functions, and 5G or other NR-type or xG technology and functions.

The communication network 102, more generally, or the core network 104 can comprise various other network equipment (e.g., routers, gateways, transceivers, switches, access points, radio access networks (RANs), network functions, processor components, data stores, or other devices) that facilitate (e.g., enable) communication of information between respective items of network equipment of the communication network 102, and/or communication of information between the one or more devices (e.g., devices 108, 110, and/or 112) and the communication network 102. The communication network 102, including the core network 104, can provide or facilitate wireless or wireline communication connections and channels between the one or more devices (e.g., devices 108, 110, and/or 112), and/or respectively associated services or application, and the communication network 102. For reasons of brevity or clarity, some of the various network equipment, components, functions, or devices of the communication network may not be explicitly shown or described herein.

At various times, the respective devices (e.g., devices 108, 110, and/or 112) can utilize respective services, such as, for example, service 114, service 116, and/or service 118). The services can comprise or relate to, for example, voice service (e.g., conversational voice services or other voice services), video streaming service, conversational video service, buffered video service, audio streaming service, other type of streaming service, text or messaging service, data service, control message service (e.g., control message service relating to control of communication network functions and operations), signaling service, real time gaming service, interactive gaming service, transmission control protocol (TCP) service, control message service relating to automated or semi-automated vehicles or motorized devices, law enforcement-related service, medical-related service, emergency-related service, military-related service, background traffic service, or other desired types of service.

As disclosed, network providers can utilize respective (e.g., different) tags, such as QoS tags, which can be associated with the respective services (e.g., 114, 116, and/or 118) and associated data, to set respective priorities for the services and associated data in connection with communication of such data to or from the core network 104 and base stations (e.g., base station 106) of the communication network 102. For example, respective QoS tags can be utilized by network providers to set respective priorities for the respective services and associated data based at least in part on respective performance indicators (e.g., key performance indicators (KPIs)), comprising the respective latency (e.g., respective delay), respective jitter, respective packet drop sensitivity, respective data throughput, respective bandwidth, respective data packet retransmission rate, or other respective attribute or factor (e.g., other respective performance indicator) associated with the respective services, and handle network congestion on communication links between the base stations and the core network 104. Respective services can have respective priority levels, respective SLAs, respective operational specifications, and/or other respective attributes, and the respective QoS tags for the respective services can be determined based at least in part on the respective priority levels, respective SLAs, respective operational specifications, and/or other respective attributes. For instance, an operational specification or SLA associated with a service (e.g., service 114) can specify or indicate a priority level, a threshold maximum amount of latency, a threshold maximum amount of jitter, a threshold maximum data pack loss rate, and/or another threshold attribute value that can be acceptable for operation of the service, and a desirable QoS tag for that service can be determined based at least in part on the priority level, the threshold maximum amount of latency, the threshold maximum amount of jitter, the threshold maximum data pack loss rate, and/or the other threshold attribute value associated with (e.g., applicable to) the service.

As an example, TABLE 1 presents some non-limiting example attributes, such as delay budget (e.g., latency in milliseconds (ms)) and packet drop rate (e.g., packet loss rate), and associated attribute threshold values for some example types of services, in accordance with their SLAs.

TABLE 1

| Example Attributes and Attribute Threshold Values | | |
| --- | --- | --- |
| | Delay Budget (ms) | Packet Drop Rate |
| Conversational voice | 100 | $10^{-2}$ |
| Conversational video | 150 | $10^{-3}$ |
| Real time gaming | 50 | $10^{-6}$ |
| Streaming | 300 | $10^{-6}$ |
| Control messages | 100 | $10^{-6}$ |
| Buffered video | 300 | $10^{-6}$ |
| Interactive gaming | 100 | $10^{-3}$ |
| TCP services | 300 | $10^{-6}$ |
| Background traffic | 300 | $10^{-6}$ |

If a service has a relatively lower delay budget (e.g., 50 ms or 100 ms), this often can translate to it being desirable (e.g., wanted, suitable, needed, or optimal) for that service to have a relatively higher QoS tag associated with a relatively higher QoS level assigned to such service, whereas, if a service has a relatively higher delay budget (e.g., 300 ms), this often can translate to it being desirable for that service to have a relatively lower QoS tag associated with a relatively lower QoS level assigned to such service, since there is only a finite amount of network resources available. It is noted that delay budget is but one factor of a number of factors that can be considered and balanced when determining a QoS tag to assign to a service. For example, while, as presented in TABLE 1, the example control message service (e.g., control messages relating to control of the functions and operations of the communication network 102) can have a delay budget of 100 ms, which, while a relatively lower value, is higher than the delay budget of 50 ms for the example real time gaming service, control messages can be a higher priority than real time gaming, since it can be more desirable (e.g., wanted, needed, important, or optimal) to have the communication network 102 operate properly than to ensure that real time gaming operates properly, and accordingly, it may be desired to have the QoS tag assigned to the control message service be higher than the QoS tag assigned to the real time gaming service. It is to be appreciated and understood that the example attribute values and the example services listed in TABLE 1 are non-limiting examples, and there can be other services in addition to, or instead of, the services listed in TABLE 1 the attribute values can be different that presented in TABLE 1, and the attributes under consideration can include other types of attributes than presented in TABLE 1.

In some embodiments, respective QoS tags can have or be associated with respective values (e.g., numerical values, such as differentiated services code point (DSCP) values, virtual local area network (VLAN) priority values, or other type of values) that can indicate respective QoS levels and/or priority levels associated with the respective QoS tags. In certain embodiments, a set of QoS tags can comprise 64 different QoS tags that can range from QoS tag 0 up through QoS tag 63, wherein the lower the QoS tag number (e.g., QoS tag 0), the lower the QoS level and/or priority level, and the higher the QoS tag number (e.g., QoS tag 63), the higher the QoS level and/or priority level. Accordingly, a higher priority service for which a higher QoS level and/or priority level is desired typically can have a higher QoS tag (e.g., QoS tag 45) than a QoS tag (e.g., QoS tag 25) that can be assigned to a relatively lower priority service for which a lower QoS level and/or priority level can be desired or acceptable. As a non-limiting example, a voice service may be assigned QoS tag 46 (e.g., DSCP 46), which can correspond to a priority level of 1, a signaling service also may be assigned QoS tag 46, which can correspond to a priority level of 1, a streaming service may be assigned QoS tag 36, which can correspond to a priority level of 2, a buffered video service may be assigned QoS tag 24, which can correspond to a priority level of 3, and/or other or more other services may be assigned respective QoS tags with numbers that can be higher or lower than 24, or can be 24, and which can correspond to respective QoS levels and/or priority levels that can be greater or lower than 3, or can be 3. It is to be appreciated and understood that, in other example embodiments, the services (e.g., voice service, signaling service, streaming service, or buffered video service) can have different QoS tag numbers and/or different priority levels than the above example. It also is to be appreciated and understood that, in certain embodiments, other types of QoS tagging, such as VLAN priority tags or other desired type of tags can be utilized to tag respective data associated with respective services (e.g., registered services).

Existing tagging techniques for tagging data with tags, such as QoS tags, can suffer from various problems, inefficiencies, and deficiencies, such as described herein. For instance, existing tagging techniques can be static, or at least substantially static and inflexible, regardless of any varying congestion on services and SLA satisfaction or violation, such as described herein. The disclosed subject matter can address and overcome such problems, inefficiencies, and deficiencies of existing techniques with regard to QoS tagging.

To that end, in accordance with various embodiments, the system 100 can comprise a network monitor component 120 that can desirably (e.g., automatically, dynamically, efficiently, reliably, suitably, enhancedly, or optimally) manage and perform QoS tagging associated with the services (e.g., 114, 116, and/or 118) and data associated therewith, in accordance with various aspects and embodiments of the disclosed subject matter. The network monitor component 120, and associated components of the system 100, can address and overcome the problems, inefficiencies, and deficiencies of existing techniques with regard to QoS tagging. For instance, the network monitor component 120 can employ enhanced QoS tagging techniques that can desirably (e.g., advantageously, beneficially, enhancedly, or optimally) have QoS tagging for the services (e.g., 114, 116, and/or 118) be dynamic and automatically adaptable to varying conditions and data traffic patterns of the communication network 102 to enable more efficient utilization of resources of the communication network 102 across varying conditions and data traffic patterns of the communication network 102, mitigate degradation of the services, reduce or minimize SLA violations associated with the services, and/or apply (e.g., automatically, dynamically, and/or adaptively assign, update, or apply) respective QoS tagging for respective services for respective base stations (e.g., base station 106) and respective core networks (e.g., core network 104), among other benefits, such as described herein.

In some embodiments, the network monitor component 120 can be located outside of the communication network 102 and core network 104, and can be associated with (e.g., communicatively connected to) the core network 104 (and communication network 102) and the base stations (e.g., base station 106). In other embodiments, the network monitor component 120 can be part of the communication network 102 or core network 104, and can be associated with (e.g., communicatively connected to) the base stations (e.g., base station 106). In certain embodiments, the core network 104 can employ an Open RAN (O-RAN) architecture, and can comprise a service management and orchestration (SMO) platform, where the network monitor component 120 can be part of the SMO platform or can be associated with the SMO platform.

The network monitor component 120 can employ automated dynamic updating of QoS tags assigned to services (e.g., 114, 116, and/or 118) and associated data packets in real time, or at least near real time, to ensure that SLAs of higher priority services are satisfied while also adjusting (e.g., temporarily adjusting) assignments of lower priority services that are determined to be degraded (e.g., in violation of SLA) to enable such lower priority services to satisfy their SLAs. The network monitor component 120 can achieve such desirable automated dynamic updating of QoS tags assigned to services by implementing, managing, and/or performing various functions. For instance, the network monitor component 120 can utilize protocols, such as TWAMP, that can sense transport layer performance of the transport layer of the communication network 102 in a continuous, substantially continuous, automated, and/or dynamic manner. The output data (e.g., responses of the base station 106 and/or core network 104 to the TWAMP signals or other test signals) can provide the network monitor component 120 with clear visibility of the delay, jitter, packet loss, or other attribute on the transport layer path for each type of service. The transport layer can refer, or relate, to connectivity (e.g., fiber, microwave, copper, or other type of connectivity) between the core network 104 and a base station (e.g., base station 106).

The network monitor component 120 can compare this output data against the SLA of each service in terms of delay, jitter, packet loss, or other attribute to facilitate determining whether there is an SLA violation associated with a service. If, based at least in part on the results of such comparison, the network monitor component 120 determines that a particular service is experiencing an SLA violation, the network monitor component 120 can promote the QoS tag for that particular service to assign (e.g., temporarily assign) a higher QoS tag to the particular service to enable the particular service to satisfy its SLA (e.g., provided that there is no temporary ban in place to prohibit such promotion to the higher QoS tag), and initiate closed-loop (e.g., feedback loop) monitoring associated with the particular service and the QoS tags, as well as the other services associated with the higher QoS tag, such as described herein. The network monitor component 120 can utilize the closed-loop monitoring to monitor the services by applying test signals (e.g., TWAMP signals or other type of test signals) to the base stations (e.g., base station 106) and the core network 104. For instance, the network monitor component 120 can utilize the closed-loop monitoring and the application of test signals to monitor the services, including the higher priority services, for SLA violations, and, for services with promoted QoS tags, to monitor those services to determine whether those services can be demoted back to their original lower QoS tag while still satisfying their SLA.

If, based at least in part on the results of such monitoring and analysis of output data (e.g., test result data) derived from the test signals, the network monitor component 120 determines that a higher priority service associated with a higher QoS tag is degraded (e.g., is experiencing an SLA violation), for example, due to one or more lower priority services being promoted to that higher QoS tag, the network monitor component 120 can demote the QoS tag for the one or more lower priority services to their original lower QoS tags, and can ban (e.g., temporarily ban) those services from being promoted back up to the higher QoS tag for a defined time period. In some embodiments, even if there is no SLA violation identified with regard to the higher QoS tag, if, based at least in part on the results of such monitoring and analysis of output data, the network monitor component 120 determines that a service that had been promoted to the higher QoS tag (e.g., due to a previous SLA violation) would be able to satisfy its SLA at its original lower QoS tag, the network monitor component 120 can demote the QoS tag for that service back to the original lower QoS tag assigned to that service.

The network monitor component 120 and the enhanced QoS tagging management techniques employed by the network monitor component 120 and associated components, such as described herein, can utilize test signals (e.g., TWAMP signals) in a continuous, substantially continuous, automated, and/or dynamic manner to detect degrading (e.g., SLA violations) of services caused by transport layer congestion or for other reasons, can dynamically and automatically control assignments of respective QoS tags to respective services (e.g., 114, 116, and/or 118) for QoS enhancement (e.g., QoS optimization) for the services, can opportunistically free up higher QoS tags and associated network resources for higher priority services as well as for lower priority promoted services that had been degraded to avoid or mitigate (e.g., reduce or minimize) congestion of the communication network 102 (e.g., avoid or mitigate congestion of the transport layer and network resources of the communication network 102), and can desirably monitor and maintain SLA for services, including higher priority services, amid dynamic QoS tag updates.

Figure 2:
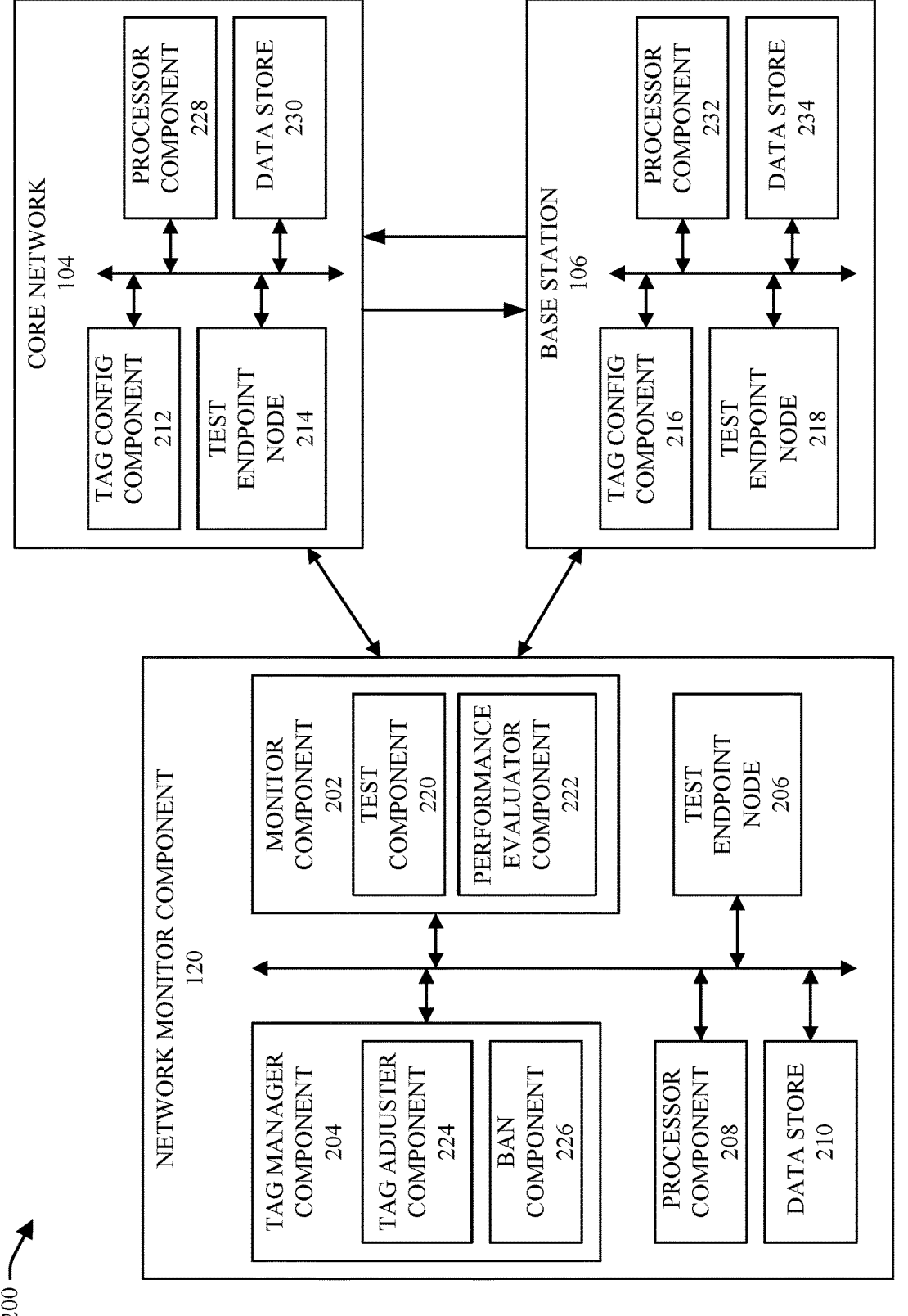
FIG. 2 depicts a block diagram of a non-limiting example system that can desirably manage and perform QoS tagging associated with services, in accordance with various aspects and embodiments of the disclosed subject matter.

Referring to FIG. 2 (along with FIG. 1), FIG. 2 depicts a block diagram of a non-limiting example system 200 (which can be part of the system 100) that can desirably (e.g., automatically, dynamically, efficiently, reliably, suitably, enhancedly, or optimally) manage and perform QoS tagging associated with services, in accordance with various aspects and embodiments of the disclosed subject matter. The system 200 can comprise the core network 104, the base station 106, and the network monitor component 120.

The core network 104 can be associated with (e.g., communicatively connected to) one or more base stations, including the base station 106, and the network monitor component 120 can be associated with (e.g., communicatively connected to) the core network 104 and the one or more base stations, including the base station 106. The network monitor component 120 can comprise a monitor component 202, a tag manager component 204, a test endpoint node 206, a processor component 208, and a data store 210. The core network 104 can comprise a tag configuration component (TAG CONFIG COMPONENT) 212 and a test endpoint node 214 as well as other network equipment. The test endpoint node 214 can be a server, router, or other network equipment (e.g., other network node) of the core network 104. The base station 106 can comprise a tag configuration component 216 and a test endpoint node 218 as well as other network equipment. The test endpoint node 218 can be a transceiver, router, or other network equipment (e.g., other network node) of the base station 106.

In some embodiments, respective original (e.g., initial), baseline, or non-promoted QoS tags can be assigned to respective services (e.g., 114, 116, and/or 118) and associated data based at least in part on the respective attributes (e.g., KPIs, such as priority level, latency, jitter, packet loss rate, or other attribute) associated with the respective services. In certain embodiments, personnel associated with a network provider can determine the respective original, baseline, or non-promoted QoS tags for the respective services (e.g., 114, 116, and/or 118) and associated data, and can assign such QoS tags to the respective services, based at least in part on the respective attributes associated with the respective services. In other embodiments, the tag manager component 204 can determine the respective original, baseline, or non-promoted QoS tags for the respective services (e.g., 114, 116, and/or 118) and associated data, and can assign such QoS tags to the respective services, based at least in part on the respective attributes associated with the respective services.

The tag manager component 204 can store information (e.g., mapping, linking, and/or table information) relating to or indicating the respective original, baseline, or non-promoted QoS tags assigned to the respective services in the data store 210. In some embodiments, the tag manager component 204 can generate an original QoS tag table, comprising the information (e.g., mapping information) relating to or indicating the respective original, baseline, or non-promoted QoS tags assigned to the respective services, and can store the original QoS tag table in the data store 210 (e.g., in a database in the data store 210). For example, the original QoS tag table can, for each service (e.g., each registered service), indicate or specify an original, baseline, or non-promoted QoS tag (e.g., original QoS tag that can have a QoS tag number, DSCP number, or VLAN priority value) associated with (e.g., assigned to) that service and/or other desired information relating to the service and/or the original QoS tag, wherein such other information can comprise information relating to or indicating the QoS tag level, VLAN priority level, or other priority level associated with the service.

A QoS tag assigned to a service (e.g., 114) for uplink data communications can be same as or different from a QoS tag assigned to that service for downlink data communications. The tag manager component 204 can respectively and independently control the assignments of respective QoS tags, including adjustments (e.g., promotions or demotions; modifications or changes) to assignments of respective QoS tags, for uplink data communications and downlink data communications for each service (e.g., 114, 116, or 118), in accordance with the defined tag management criteria, such as described herein.

An original, baseline, or non-promoted QoS tag associated with a service (e.g., 114, 116, or 118) can be the first QoS tag assigned to the service, or, if there has been a change (e.g., permanent or long term change) to the QoS tag assignment to another QoS tag (e.g., another QoS tag that is higher or lower than the previous QoS tag), such other QoS tag can become the original, baseline, or non-promoted QoS tag associated with a service. In some embodiments, the tag manager component 204 can adjust (e.g., temporarily adjust) a tag assignment associated with a service to promote (e.g., temporarily promote) the QoS tag for the service from its original, baseline, or non-promoted QoS tag to a promoted or higher (e.g., higher level) QoS tag, such as described herein.

The core network 104 can employ the tag configuration component 212 to set, configure, re-set, or re-configure (e.g., automatically, dynamically, and/or adaptively set, configure, re-set, or re-configure) the respective QoS tags associated with the respective services (e.g., 114, 116, and/or 118) for downlink data communications, in accordance with the tag assignments made by and received from the tag manager component 204 and/or the network provider personnel. The tag configuration component 212 can associate (e.g., link) or apply the respective QoS tags to respective data packets associated with the respective services in connection with the downlink communication of the respective data packets, and respective associated QoS tags, from the core network 104 to the base station 106. The respective data packets associated with the respective services can be communicated and routed via respective data communication paths and/or respective queues (e.g., on the transport layer) based at least in part on (e.g., in accordance with) the respective QoS tags and their respective QoS levels. For instance, the core network 104 can communicate and route data packets associated with a higher QoS tag to the base station 106 via faster and/or more reliable data communication paths and/or queues than other data packets associated with a lower QoS tag. For example, data packets associated with a higher QoS tag can be routed via one or more priority queues that can enable faster and/or more reliable communication of the data packets to or towards their destination (e.g., end device, such as device 108), and data packets associated with a lower QoS tag can be routed via one or more other lower priority queues (e.g., weighted round robin queue or other type of queue) that can communicate the data packets to or toward their destination at a relatively lower speed and/or relative lower level of reliability, as compared to the priority queues.

The base station 106 can employ the tag configuration component 216 to set, configure, re-set, or re-configure (e.g., automatically, dynamically, and/or adaptively set, configure, re-set, or re-configure) the respective QoS tags associated with the respective services (e.g., 114, 116, and/or 118) for uplink data communications, in accordance with the tag assignments made by and received from the tag manager component 204 and/or the network provider personnel. The tag configuration component 216 can associate or apply the respective QoS tags to respective data packets associated with the respective services in connection with the uplink communication of the respective data packets, and respective associated QoS tags, from the base station 106 to the core network 104. The respective data packets associated with the respective services can be communicated and routed via respective data communication paths and/or respective queues (e.g., on the transport layer) based at least in part on (e.g., in accordance with) the respective QoS tags and their respective QoS levels. For instance, the base station 106 can communicate and route data packets associated with a higher QoS tag to the core network 104 via faster and/or more reliable data communication paths and/or queues than other data packets associated with a lower QoS tag.

The monitor component 202 can monitor respective network performance of the communication network 102, including respective network performance associated with the core network 104 and the base station 106, with regard to respective services (e.g., 114, 116, and/or 118) of a group of services 250 and respective QoS tags associated with the respective services, based at least in part on respective test messages (e.g., TWAMP messages or other type of test messages) that can be initiated or triggered by the monitor component 202, wherein the group of services 250 can be or can comprise registered services(S) (e.g., $S_1$, $S_2$, $S_3$, . . . , $S_n$). In some embodiments, the monitor component 202 can comprise a test component 220 that can send (e.g., automatically, periodically, or dynamically communicate) respective test signals associated with the respective services (e.g., registered services of the group of services 250) and/or the respective QoS tags associated therewith, such as the services 114, 116, and/or 118, to the core network 104 and the base station 106 to initiate or trigger, or facilitate triggering, communication of respective test messages associated with the respective services and/or the respective QoS tags from the core network 104 to the base station 106 and respective test response messages to those respective test messages from the base station 106 to the core network 104, and communication of respective test messages associated with the respective services and/or the respective QoS tags from the base station 106 to the core network 104 and respective test response messages to those respective test messages from the core network 104 to the base station 106. The respective test messages and the respective response messages can facilitate (e.g., enable) measurement of the respective network performance of the communication network 102, including the core network 104 and the base station 106, with regard to the respective services and/or respective QoS tags associated therewith, such as described herein. Also, the automatic, periodic, or dynamic sending of test signals by the test component 220 desirably (e.g., efficiently, reliably, suitably, enhancedly, or optimally) can facilitate (e.g., enable or assist) identification of any service degradations of the services (e.g., 114, 116, and/or 118), for example, caused by inefficiency of the transport layer and/or other network components of the communication network 102, and rectification or mitigation of any such service degradations of the services, more quickly (e.g., at faster time intervals) than manual testing of services by network personnel (e.g., network administrators).

In response to receiving the respective test signals associated with the respective services (e.g., 114, 116, and/or 118) and/or the respective QoS tags, the core network 104 can communicate respective test messages associated with the respective services and/or the respective QoS tags from the test endpoint node 214 to the test endpoint node 218 of the base station 106 via the transport layer. In response to receiving the respective test messages, the test endpoint node 218 of the base station 106 can communicate respective test response messages associated with the respective services and/or the respective QoS tags to the test endpoint node 214 of the core network 104 via the transport layer.

In response to the base station 106 receiving the respective test signals associated with the respective services (e.g., 114, 116, and/or 118) and/or the respective QoS tags from the test component 220, the base station 106 also can communicate respective test messages associated with the respective services and/or the respective QoS tags from the test endpoint node 218 to the test endpoint node 214 of the core network 104 via the transport layer. In response to receiving the respective test messages, the test endpoint node 214 of the core network 104 can communicate respective test response messages associated with the respective services and/or the respective QoS tags to the test endpoint node 218 of the base station 106 via the transport layer.

In some embodiments, a test message can be a TWAMP message that can comprise one or more test data packets (e.g., TWAMP, Internet control message protocol (ICMP), or other type of test data packet) that can be communicated from a first endpoint node (e.g., the test endpoint node 214; or conversely, the test endpoint node 218) to a second endpoint node (e.g., the test endpoint node 218; or conversely, the test endpoint node 214) via the transport layer, where, in response to receiving the test message, the second endpoint node can communicate a TWAMP response message that can comprise one or more test response data packets that can be communicated from the second endpoint node to the second endpoint node. With regard to each test message, the sender (e.g., the test endpoint node 214; or conversely, the test endpoint node 218) of the test message or another component associated with the sender of the test message can track, measure, and/or determine the network response, including the responses of the receiver of the test message (including the sending of the test response message), the transport layer, and/or other associated network components, to the test message. To facilitate the tracking, measuring, and/or determining of the network response, there can be timestamping of the test data packets in connection with the sending of the test data packets and timestamping of test response data packets in connection with the sending of the test response data packets, wherein such timestamp information can be utilized to measure or determine certain performance indicators, such as delay and jitter, associated with the sending of the test data packets and the sending of the test response data packets. Also, to facilitate the tracking, with regard to each service (e.g., 114, 116, or 118), the test data packets of the test message and the test response data packets of the test response message can include, for example, in the header information of such data packets, the QoS tag value (e.g., DSCP value, VLAN tag value, or other tag value) associated with the service being tested using that test message and test response message.

Accordingly, with regard to each test message associated with each service (e.g., 114, 116, or 118) and/or associated QoS tag, in response to the test endpoint node 214 receiving the test response message associated with that service and/or QoS tag from the test endpoint node 218 of the base station 106, the test endpoint node 214 or another component of the core network 104 can determine or measure a group of performance indicators (e.g., a group of KPIs comprising delay, jitter, data packet loss rate, or other KPI) that can indicate the network performance (e.g., of the core network 104, base station 106, transport layer, and/or other associated component) in response to the sending of the test message to the test endpoint node 218 of the base station 106 and the sending of the test response message from the test endpoint node 218 to the test endpoint node 214 of the core network 104. The core network 104 (e.g., the test endpoint node 214 or other component of the core network 104) can communicate network response information comprising or relating to the respective groups of performance indicators associated with the respective services (e.g., 114, 116, and/or 118) and/or respective QoS tags with respect to that round of testing of network performance from the core network side.

Also, with regard to each test message associated with each service (e.g., 114, 116, or 118) and/or associated QoS tag, in response to the test endpoint node 218 of the base station 106 receiving the test response message associated with that service and/or QoS tag from the test endpoint node 214 of the core network 104, the test endpoint node 218 or another component of the base station 106 can determine or measure a group of performance indicators (e.g., a group of KPIs comprising delay, jitter, data packet loss rate, or other KPI) that can indicate the network performance (e.g., of the core network 104, base station 106, transport layer, and/or other associated component) in response to the sending of the test message to the test endpoint node 214 of the core network 104 and the sending of the test response message from the test endpoint node 214 to the test endpoint node 218 of the base station 106. The base station 106 (e.g., the test endpoint node 218 or other component of the base station 106) can communicate network response information comprising or relating to the respective groups of performance indicators associated with the respective services (e.g., 114, 116, and/or 118) and/or respective QoS tags with respect to that round of testing of network performance from the base station side.

The network monitor component 120 (e.g., the monitor component 202) can receive the network response information comprising or relating to the respective groups of performance indicators associated with the respective services (e.g., 114, 116, and/or 118) and/or respective QoS tags with respect to that round of testing of network performance from the core network side, and can receive the network response information comprising or relating to the respective groups of performance indicators associated with the respective services and/or respective QoS tags with respect to that round of testing of network performance from the base station side. The network monitor component 120 can store that respective network response information in the data store 210.

In some embodiments, with regard to each round of testing, the monitor component 202, employing a performance evaluator component 222, can analyze (e.g., automatically analyze or evaluate) the network response information (e.g., respective groups of performance indicators) with respect to that round of testing of network performance from the core network side, the network response information (e.g., respective groups of performance indicators) with respect to that round of testing of network performance from the base station side, and respective service specification information (e.g., respective SLAs or other respective service specifications) associated with the respective services (e.g., 114, 116, and/or 118) of the group of services 250. In certain embodiments, as part of the analysis, with regard to each service, the performance evaluator component 222 can compare the respective performance indicators (e.g., performance indicator values) of the group of performance indicators associated with that service to respective (e.g., corresponding and/or applicable) threshold performance indicator values associated with (e.g., indicated by, determined from, or obtained from) the service specification information for that service to facilitate determining whether one or more of the respective performance indicators do not satisfy (e.g., do not meet, do not comply with, or otherwise do not satisfy) one or more of the respective threshold performance indicator values.

Based at least in part on the results of analyzing the network response information (e.g., respective groups of performance indicators) from the core network side, the network response information (e.g., respective groups of performance indicators) from the base station side, and the respective service specification information associated with the respective services (e.g., 114, 116, and/or 118), the performance evaluator component 222 can determine whether one or more of the respective services associated with one or more respective QoS tags are experiencing degraded performance (e.g., are experiencing violation of their respective service specifications (e.g., their respective SLAs)). For instance, with regard to each service of the group of services 250, based at least in part on the analysis results, the performance evaluator component 222 can determine whether one or more respective performance indicators (e.g., performance indicator values) of the group of performance indicators associated with that service do not satisfy one or more respective threshold performance indicator values associated with the service specification information for that service. A failure of one or more of the respective performance indicators to satisfy one or more of the respective threshold performance indicator values can mean or indicate that the service is experiencing degraded performance at its currently assigned QoS tag (e.g., due in part to or caused by inefficiency in the transport layer and/or associated network components of the communication network 102). If the respective performance indicators are determined to satisfy the respective threshold performance indicator values, this can mean or indicate that the service is not experiencing degraded performance at its currently assigned QoS tag and is currently in compliance with its service specification (e.g., its SLA). With regard to each service, based at least in part on the results of such determinations with regard to whether the respective performance indicators satisfy the respective threshold performance indicator values, the performance evaluator component 222 can generate service performance information that can indicate or specify whether that service is in compliance with its service specification, or is instead experiencing degraded performance, at its currently assigned QoS tag, whether the service is or would be in compliance with its service specification, or instead is or would be experiencing degraded performance, at its originally assigned QoS tag (e.g., which may or may not be different from its currently assigned QoS tag), and/or the respective QoS tags at which the service can be in compliance with its service specification.

With regard to each round of testing of network performance of the communication network 102 with respect to the services, the performance evaluator component 222 can store, in the data store 210, the respective service performance information relating to the respective services and/or the respective QoS tags associated therewith that can indicate or specify whether the respective services are in compliance with their respective service specifications, or are instead experiencing degraded performance, at their respective currently assigned QoS tags, whether the respective services are or would be in compliance with their respective service specifications, or instead are or would be experiencing degraded performance, at their respective originally assigned QoS tags, and/or the respective QoS tags at which the respective services can be in compliance with their respective service specifications.

In some embodiments, the performance evaluator component 222 can generate (e.g., create) a service performance table (e.g., a pivot table or summary table for the group of services 250) that can comprise the respective service performance information relating to the respective services and/or the respective QoS tags associated therewith, or respective pivot or summary service performance information derived from the respective service performance information, with regard to the round of testing (e.g., the current or most recent round of testing of the communication network 102 using test messages). For instance, the performance evaluator component 222 can generate a service performance table that can indicate or specify which services (e.g., 114, 116, and/or 118) of the group of services 250 can be satisfied at which QoS tags for all QoS tags or all available QoS tags, with regard to the round of testing, in accordance with the defined tag management criteria. The performance evaluator component 222 can store the service performance table in the data store 210.

In certain embodiments, with regard to each QoS tag associated with a QoS level, and each service of the group of services 250, in the field or cell of the service performance table associated with such QoS tag and such service, if the service was, or can be or would be, satisfied at that QoS tag associated with that QoS level, the performance evaluator component 222 can insert a first value (e.g., a "1" value) that can indicate the service was, or can be or would be, satisfied at that QoS tag, and, if the service was not, or cannot be or would not be, satisfied at that QoS tag associated with that QoS level, the performance evaluator component 222 can insert a second value (e.g., a "0" value) that can indicate the service was not, or cannot be or would not be, satisfied at that QoS tag.

A non-limiting example of a service performance table is presented in TABLE 2.

TABLE 2

| Example Service Performance Table | | | |
|---|---|---|---|
| QoS Tag | $S_1$ | $S_2$ | $S_3$ |
| 0 | 0 | 0 | 0 |
| 33 | 0 | 0 | 0 |
| 34 | 1 | 0 | 0 |
| 39 | 1 | 0 | 0 |
| 45 | 1 | 0 | 0 |
| 46 | 1 | 1 | 0 |
| 47 | 1 | 1 | 1 |
| . . . | 1 | 1 | 1 |

As can be observed in example TABLE 2, none of the services listed in the service performance table can satisfy their respective service specifications at QoS tag 0, and none of the services listed in the service performance table can satisfy their respective service specifications at QoS tag 33. As also can be observed in example TABLE 2, at QoS tag 34, service 1 ($S_1$) can satisfy its service specification, however, service 2 ($S_2$) and service 3 ($S_3$) cannot satisfy their respective service specifications at QoS tag 34, and, at QoS tag 39 and QoS tag 45, it still can be the case that service 1 ($S_1$) can satisfy its service specification, but service 2 ($S_2$) and service 3 ($S_3$) cannot satisfy their respective service specifications at QoS tag 39 or QoS tag 45. As further can be observed in example TABLE 2, at QoS tag 46, service 1 ($S_1$) and service 2 ($S_2$) can satisfy their respective service specifications, however, service 3 ($S_3$) cannot satisfy its service specification at QoS tag 46. As also can be observed in example TABLE 2, at QoS tag 47 (and for QoS tags higher than QoS tag 47), service 1 ($S_1$), service 2 ($S_2$), service 3 ($S_3$) can satisfy their respective service specifications.

It is to be appreciated and understood that, for reasons of clarity and brevity, not all QoS tags and not all services of the group of services have been included in example TABLE 2. It also is to be appreciated and understood that, under different circumstances and/or different network conditions of the communication network 102, and/or depending on what the respective services are and what their respective service specifications are, the respective services may satisfy or not satisfy their respective service specifications at different QoS tags than as presented in example TABLE 2. It also is to be appreciated and understood that, there can be respective (e.g., separate or different) service performance tables that can indicate network performance associated with the transport layer with regard to the uplink data communications and that can indicate network performance associated with the transport layer with regard to the downlink data communications, with respect to the services, or there can be a comprehensive service performance table that can indicate network performance associated with the transport layer with regard to the uplink data communications and the downlink data communications.

The service performance information relating to the respective services (e.g., 114, 116, and/or 118) and/or the respective QoS tags can be feedback information (e.g., from the feedback loop described herein) that the tag manager component 204 desirably can utilize to facilitate determining (e.g., automatically, dynamically, efficiently, enhancedly, or optimally determine) whether to update (e.g., adjust) assignments of respective QoS tags to respective services, such as described herein. For instance, the tag manager component 204 can utilize the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) to facilitate determining whether any services have been degraded, and determining whether any adjustment is to be made to respective assignments of respective QoS tags to respective services and/or any other action is to be taken with respect to the services and/or QoS tags, in accordance with the defined tag management criteria. Utilizing the service performance information and other information (e.g., current QoS tag assignments, original QoS tag assignments, ban-related information, and/or other information) described herein, the tag manager component 204 can control (e.g., automatically, dynamically, and/or adaptively control, adjust, or update) assignments of respective QoS tags to respective services with respect to the core network 104 and the base station 106 to ensure or facilitate ensuring that respective service specifications associated with the respective services can be satisfied over the transport layer between the core network 104 and the base station 106.

In some embodiments, the tag manager component 204 can determine (e.g., automatically or dynamically determine) whether any services (e.g., 114, 116, and/or 118) have been degraded, and determine (e.g., automatically or dynamically determine) whether any adjustment is to be made to respective assignments of respective QoS tags to respective services and/or any other action is to be taken with respect to the services and/or QoS tags, based at least in part on the respective network performance information relating to respective network performance levels associated with the respective QoS tags and/or respective services, the respective original QoS tag assignments associated with the respective services, the current QoS tag assignments associated with the respective services, and/or the respective service specification information associated with the respective services, in accordance with the defined tag management criteria. In certain embodiments, the tag manager component 204 can determine whether any services (e.g., 114, 116, and/or 118) have been degraded, and determine whether any adjustment is to be made to respective assignments of respective QoS tags to respective services and/or any other action is to be taken with respect to the services and/or QoS tags, based at least in part on the service performance table (e.g., current or most recent service performance table) relating to the respective services and/or respective QoS tags, the current QoS tag table relating to current assignments of QoS tags to the respective services, and/or the original QoS tag table relating to the original (e.g., original, baseline, or non-promoted) assignments of QoS tags to the respective services, in accordance with the defined tag management criteria. The use of the service performance table, the current QoS tag table, and/or the original QoS tag table by the tag manager component 204 can desirably make such determinations relating to tag management more efficient.

As an example, TABLE 3 can present non-limiting example assignments (e.g., original, baseline, or non-promoted assignments) of respective QoS tags to respective services.

TABLE 3

| Original QoS Tag Assignments to Services | |
| --- | --- |
| Service | QoS Tag |
| $S_1$ | 34 |
| $S_2$ | 39 |
| $S_3$ | 46 |

TABLE 3.

As another example, TABLE 4 can present non-limiting example current assignments of respective QoS tags to respective services.

TABLE 4

| Current QoS Tag Assignments to Services | |
| --- | --- |
| Service | QoS Tag |
| $S_1$ | 34 |
| $S_2$ | 46 |
| $S_3$ | 46 |

It is to be appreciated and understood that, for reasons of clarity and brevity, not all QoS tags and not all services of the group of services have been included in example TABLE 3 and example TABLE 4. It also is to be appreciated and understood that, under different circumstances and/or depending on what the respective services are and what their respective service specifications are, the respective original assignments of QoS tag to respective services may be different than as presented in example TABLE 3. It further is to be appreciated and understood that, under different circumstances and/or different network conditions of the communication network 102, and/or depending on what the respective services are and what their respective service specifications are, the respective current assignments of QoS tag to respective services may be different than as presented in example TABLE 4. It also is to be appreciated and understood that, there can be respective (e.g., separate or different) original QoS tag tables and/or respective current QoS tag tables with regard to the uplink data communications and downlink data communications, or there can be a comprehensive original QoS tag table and/or a comprehensive current QoS tag table that can be utilized with regard to the uplink data communications and downlink data communications.

In accordance with various embodiments, based at least in part on the service performance information, the current assignments of QoS tags to services (e.g., 114, 116, and/or 118), and/or the original assignments of QoS tags to services, the tag manager component 204 can initiate or perform (e.g., automatically or dynamically initiate or perform) one or more of a number of actions (e.g., tag management actions) relating to tag assignments for the services, or can determine that no action has to be initiated or performed at all, at a particular time, in accordance with the defined tag management criteria. For example, if, based at least in part on the results of analyzing the service performance information, the current assignments of QoS tags to services, and/or the original assignments of QoS tags to services, the tag manager component 204 determines that a service (e.g., service 114) is experiencing degraded performance while its original QoS tag is assigned to it, the tag manager component 204 can promote (e.g., temporarily promote) the degraded service to a higher QoS tag that is determined to satisfy the service specification (e.g., SLA) associated with the service (e.g., provided the service has not been temporarily banned from being promoted to that higher QoS tag), such as more fully described herein. As another example, if, based at least in part on the results of analyzing the service performance information, the current assignments of QoS tags to services, and/or the original assignments of QoS tags to services, the tag manager component 204 determines that a service (e.g., service 116), which had been promoted to a higher QoS tag, is satisfying its service specification while at the higher QoS tag, and also determines that its service specification would still be satisfied at its original QoS tag, the tag manager component 204 can demote the service back to its original QoS tag, such as more fully described herein. As still another example, if, based at least in part on the results of analyzing the service performance information, the current assignments of QoS tags to services, and/or the original assignments of QoS tags to services, the tag manager component 204 determines that, after promoting one or more services (e.g., service 114) to a higher QoS tag from their original QoS tags, another service (e.g., service 118), which can be a higher priority service having the higher QoS tag originally assigned to it, is experiencing degraded performance, the tag manager component 204 can demote the one or more promoted services back to their original QoS tags and temporarily ban (e.g., ban for a defined time period) the one or more services from being promoted to the higher QoS tag, such as more fully described herein.

With further regard to determining whether to promote a service (wherein such analysis and determination can be performed with regard to all services, or at least all non-promoted services at that time), with regard to a service (e.g., service 114), as part of the analysis, the tag manager component 204, employing a tag adjuster component 224, can determine the current QoS tag assigned to the service based at least in part on the information relating to the current assignments of QoS tags to services (e.g., the current QoS tag table). The tag adjuster component 224 also can determine whether the current QoS tag assigned to the service is the original QoS tag assigned to the service based at least in part on analysis of the current QoS tag assigned to the service and the information relating to the original (e.g., original, baseline, or non-promoted) assignments of QoS tags to the respective services (e.g., the original QoS tag table). If the current QoS tag is the same as the original QoS indicated in the information relating to the original assignments of QoS tags to the respective services, the tag adjuster component 224 can determine that the current QoS tag is the original QoS tag assigned to the service (e.g., service 114). If, instead, the current QoS tag is not the same as the original QoS indicated in the information relating to the original assignments of QoS tags to the respective services, the tag adjuster component 224 can determine that the current QoS tag is not the original QoS tag assigned to the service (e.g., service 114), but rather the current QoS tag is a promoted or higher QoS tag than the original QoS tag that was originally or previously assigned to the service.

The tag adjuster component 224 also can determine whether the service (e.g., service 114) is experiencing degraded performance (e.g., is not satisfying its service specification) at its current QoS tag based at least in part on the results of analyzing the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) with respect to the service and the current QoS tag assigned to the service. For instance, the tag adjuster component 224 can check (e.g., analyze) the service performance table to determine whether the service specification for the service is satisfied (e.g., a "1" value) or is not satisfied (e.g., a "0" value), and thus, degraded, at its current QoS tag.

If the tag adjuster component 224 determines that the service (e.g., service 114) is not degraded, and the original QoS tag is currently assigned to the service, the tag adjuster component 224 can determine that no adjustment to the assignment of the current QoS tag (here, the original QoS tag) to the service is to be made, at least at this time, in accordance with the defined tag management criteria. If, instead, the tag adjuster component 224 determines that the service (e.g., service 114) is degraded, and the original QoS tag is currently assigned to the service, the tag adjuster component 224 can determine a higher QoS tag (e.g., a QoS tag that is associated with a higher QoS level and/or priority level, and/or has a corresponding higher tag value) than the original QoS tag that can satisfy (e.g., can meet or exceed; can be at or greater than) the service specification associated with the service based at least in part on analysis of the service performance information relating to the respective services and/or the respective QoS tags (e.g., the service performance information itself or the service performance table). For instance, based at least in part on the results of such analysis of such service performance information, the tag adjuster component 224 can determine a higher or promoted QoS tag, which can be higher than the original QoS tag associated with the service, and can satisfy the service specification associated with the service.

In certain embodiments, the tag adjuster component 224 can determine a lowest higher QoS tag, relative to other higher QoS tags, that can satisfy the service specification associated with the service (e.g., service 114) based at least in part on analysis of the service performance information, wherein the lowest higher QoS tag can be higher than the original QoS tag associated with the service, but can be the lowest of the higher QoS tags (relative to the other QoS levels or priority levels, or corresponding tag values, associated with the other higher QoS tags) that can satisfy the service specification associated with the service. Such lowest higher QoS tag can be the QoS tag that, if assigned to the service (e.g., service 114), would result, or at least can be predicted or expected to result, in the respective performance indicators satisfying the respective threshold performance indicator values associated with the service specification associated with the service, wherein a next lower QoS tag (e.g., which can be higher than the original QoS tag) would not result, or at least can be predicted or expected to not result, in the respective performance indicators satisfying the respective threshold performance indicator values associated with the service specification associated with the service, based at least in part on the service performance information.

The tag adjuster component 224 also can determine whether the service (e.g., service 114) is banned (e.g., currently and temporarily banned for a defined time period) from being promoted to have such higher QoS tag assigned to the service based at least in part on ban-related information that can indicate QoS tags (e.g., relatively higher priority QoS tags), if any (at that time), that can have bans or restrictions in place to ban, restrict, or prohibit lower priority services associated with lower priority, originally assigned QoS tags from being promoted to those QoS tags that have bans or restrictions in place. For instance, the tag adjuster component 224 can analyze the ban-related information (e.g., generated or maintained by a ban component 226) that can indicate whether the service is banned from being promoted to have such higher QoS tag. If the tag adjuster component 224 determines that the service (e.g., service 114) is subject to a ban (e.g., a current and temporary ban for the defined time period) from being promoted to the higher QoS tag, the tag adjuster component 224 can determine that no adjustment to the assignment of the current QoS tag (here, the original QoS tag) to the service is to be made, at least at this time, in accordance with the defined tag management criteria.

If, instead, based at least in part on the results of analyzing the ban-related information, the tag adjuster component 224 determines that the service (e.g., service 114) is not subject to a ban from being promoted to the higher QoS tag, the tag adjuster component 224 can determine that an adjustment to the QoS tag assignment of the service can be made, and can adjust (e.g., modify) or update the QoS tag assignment for the service from the original QoS tag to the higher or promoted QoS tag associated with the higher QoS level or higher priority level than the original QoS tag, in accordance with the defined tag management criteria.

With further regard to the ban-related information, the ban-related information can be or can comprise a flag or indicator associated with the service and/or the higher QoS tag, a list of QoS tags that have a ban in place and/or a list of services subject to the ban, and/or other type of ban-related information that can indicate or specify any bans on QoS tag promotion for services (e.g., certain relatively lower priority services) that may be in place. The ban component 226 can track or manage the respective bans on QoS tag promotion for services that may be in place, including modifying the ban-related information to indicate when a new ban on QoS tag promotion for services with respect to a particular QoS tag(s) is initiated or instituted, and indicate when a ban on QoS tag promotion for services with respect to a particular QoS tag(s) has expired. The ban-related information can be stored in the data store 210.

In some embodiments, a defined time period of a particular ban with respect to a particular QoS tag can be determined or set by a user (e.g., network operator or other personnel). In certain embodiments, respective (e.g., different or separate) defined time periods can be determined and set with respect to respective QoS tags (e.g., respective higher priority QoS tags). For example, it may be desirable (e.g., wanted, suitable, beneficial, or optimal) to have ban for a longer defined time period for a certain higher priority QoS tag that can be assigned (e.g., originally assigned) to a certain higher priority service(s) (e.g., a very high priority service) than an amount of time for another defined time period for a ban employed for another higher priority QoS tag that can be assigned (e.g., originally assigned) to another higher priority service(s).

With further regard to determining whether to demote a service that has its service specification satisfied (wherein such analysis and determination can be performed with regard to all services, or at least all promoted services at that time), the tag adjuster component 224 can determine the current QoS tag assigned to the service (e.g., service 116) based at least in part on the information relating to the current assignments of QoS tags to services (e.g., the current QoS tag table). The tag adjuster component 224 also can determine whether the current QoS tag assigned to the service (e.g., service 116) is the original QoS tag assigned to the service based at least in part on analysis of the current QoS tag assigned to the service and the information relating to the original assignments of QoS tags to the respective services (e.g., the original QoS tag table), such as described herein. In this example case, the tag adjuster component 224 can determine that the current QoS tag assigned to the service (e.g., service 116) is a promoted (e.g., higher) QoS tag based at least in part on such analysis. For instance, this can be a case where the QoS tag assignment for the service previously had been adjusted by the tag adjuster component 224 to promote the service by having the higher QoS tag assigned to the service.

The tag adjuster component 224 also can determine whether the service (e.g., service 116) is satisfied with regard to performance (e.g., the service specification associated with the service is satisfied) or is instead experiencing degraded performance (e.g., the service specification is not satisfied) based at least in part on the results of analyzing the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) with respect to the service and the current promoted or higher QoS tag assigned to the service, such as described herein. In this example case, from such analysis, the tag adjuster component 224 can determine that the service specification associated with the service (e.g., service 116) is satisfied at the current promoted or higher QoS tag assigned to the service (e.g., at the current promoted or higher QoS tag, the respective performance indicators satisfy the respective threshold performance indicator values associated with the service specification associated with the service).

In response to determining that the service specification associated with the service (e.g., service 116) is satisfied at the current promoted or higher QoS tag assigned to the service, the tag adjuster component 224 also can determine whether the service specification associated with the service (e.g., service 116) would be satisfied at the original QoS tag for the service based at least in part on the results of analyzing the service performance information relating to the respective services (e.g., 114, 116, and/or 118) and/or the respective QoS tags with respect to the service and the original QoS tag assigned to the service. If, based at least in part on the results of such analysis, the tag adjuster component 224 determines that the service specification associated with the service (e.g., service 116) would not be satisfied at the original QoS tag for the service, the tag adjuster component 224 can determine that no adjustment to the assignment of the current QoS tag (here, the promoted or higher QoS tag) to the service is to be made, at least at this time, in accordance with the defined tag management criteria.

If, instead, based at least in part on the results of such analysis, the tag adjuster component 224 determines that the service specification associated with the service (e.g., service 116) would be satisfied at the original QoS tag for the service, the tag adjuster component 224 can determine that an adjustment to the QoS tag assignment of the service can be made, and can adjust (e.g., modify) or update the QoS tag assignment for the service from the promoted or higher QoS tag (e.g., associated with the higher QoS level or higher priority level) to the original QoS tag (e.g., associated with relatively lower QoS level or lower priority level), in accordance with the defined tag management criteria.

By demoting a previously promoted service to its original lower QoS tag from a promoted higher QoS tag when the service specification for such service can be satisfied at the original lower QoS tag (e.g., based at least in part on the feedback information, such as the service performance information), the network monitor component 120 (employing the tag manager component 204) can enable or enhance sustainability of the enhanced tag management scheme by utilizing lower QoS tags (e.g., lower original QoS tags) for services (e.g., lower priority services) when feasible (e.g., when the service specification for such service can be satisfied at the original lower QoS tag), and can desirably (e.g., efficiently, reliably, suitably, enhancedly, or optimally) and opportunistically free up (e.g., make available) higher QoS tags for higher priority services, and/or other services that are experiencing degraded performance, and network resources for those higher priority services and/or degraded services.

With further regard to determining whether to demote and ban a service from a higher QoS tag due to a higher priority service experiencing degraded performance at that higher QoS tag (wherein such analysis and determination can be performed with regard to all services, or at least all promoted services at that time), the tag adjuster component 224 can determine the current QoS tag assigned to the service (e.g., service 118) based at least in part on the information relating to the current assignments of QoS tags to services (e.g., the current QoS tag table). The tag adjuster component 224 also can determine whether the current QoS tag assigned to the service (e.g., service 118) is the original QoS tag assigned to the service based at least in part on analysis of the current QoS tag assigned to the service and the information relating to the original assignments of QoS tags to the respective services (e.g., the original QoS tag table), such as described herein. In this example case, the tag adjuster component 224 can determine that the current QoS tag assigned to the service (e.g., service 118) is the original QoS tag assigned to the service based at least in part on such analysis. In this example case, the service (e.g., service 118) can be a higher priority service, and the original QoS tag assigned to the service can be a relatively higher QoS tag associated with a relatively higher QoS level or priority level.

The tag adjuster component 224 also can determine whether the service (e.g., service 118) is experiencing degraded performance (e.g., the service specification associated with the service is not satisfied) at its current original and higher priority QoS tag based at least in part on the results of analyzing the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) with respect to the service and the current original and higher priority QoS tag assigned to the service, such as described herein. In this example case, based at least in part on the results of such analysis, the tag adjuster component 224 can determine that the service specification associated with the service (e.g., service 118) is not satisfied, and thus, the service is experiencing degraded performance, at the current original and higher priority QoS tag assigned to the service (e.g., at the current original and higher priority QoS tag, one or more of the respective performance indicators do not satisfy the respective threshold performance indicator values associated with the service specification associated with the service 118).

In response to determining or detecting that the service (e.g., service 118) is experiencing degraded performance while having its current original and higher priority QoS tag assigned to it, the tag adjuster component 224 can determine all services (e.g., service 116 and/or one or more other services) that are currently assigned the same higher priority QoS tag as the service (e.g., service 118), based at least in part on the results of analyzing the information relating to the current assignments of QoS tags to services (e.g., the current QoS tag table). The tag manager component 204, employing the ban component 226, can initiate, execute, institute, or implement a ban (e.g., a prohibition or restriction), for a defined time period (e.g., a defined amount of time), on assignment of this higher priority QoS tag to any service that does not have this higher priority QoS tag as its original QoS tag (e.g., to any lower priority service associated with an original lower priority QoS tag).

With regard to each service (e.g., service 118 and service 116) currently associated with (e.g., assigned with) the higher priority QoS tag, the tag adjuster component 224 can determine whether such service is currently associated with its original QoS tag, or whether there had been a QoS tag promotion to assign the higher QoS tag to such service. If the tag adjuster component 224 determines that such service is currently associated with its original QoS tag, with that tag being the higher priority QoS tag, the tag adjuster component 224 can determine that no adjustment to the assignment of the current QoS tag (here, the original higher priority QoS tag) to the service is to be made, in accordance with the defined tag management criteria. For instance, if, based at least in part on the results of analyzing the information relating to the original assignments of QoS tags to services (e.g., the original QoS tag table), the tag adjuster component 224 determines that a particular service (e.g., service 118) is currently associated with its original QoS tag, which can be the higher priority QoS tag, the tag adjuster component 224 can determine that no adjustment to the assignment of the current QoS tag (here, the original higher priority QoS tag) to the service (e.g., service 118) is to be made and the original higher priority QoS tag is to remain assigned to the service.

If, instead, based at least in part on the results of analyzing the information relating to the original assignments of QoS tags to services, the tag adjuster component 224 determines that a certain service (e.g., service 116) is associated with an original QoS tag that is not the higher priority QoS tag (e.g., the certain service previously had been promoted to have it assigned to the higher priority QoS tag), the tag adjuster component 224 can determine that an adjustment to the QoS tag assignment of the service can be made, and can adjust or update the QoS tag assignment for the service from the promoted or higher priority QoS tag (e.g., associated with the higher QoS level or higher priority level) to the original QoS tag (e.g., associated with relatively lower QoS level or lower priority level), in accordance with the defined tag management criteria. In some embodiments, the tag adjuster component 224 can demote all such services that are determined to have an original QoS tag (e.g., original lower priority QoS tag) that is not the higher priority QoS tag with regard to which the ban is being initiated or implemented. The ban component 226 also can ban those lower priority services (e.g., service 116), for the defined time period, from being promoted to have the higher priority QoS tag assigned to them, such as described herein.

The tag manager component 204, by demoting lower priority services from a higher priority QoS tag back to their lower priority QoS tags and temporarily banning lower priority services from being promoted to the higher priority QoS tag, can desirably (e.g., efficiently, reliably, enhancedly, or optimally) protect higher priority services associated with (e.g., originally assigned with) higher priority QoS tags from experiencing degraded performance, or at least can desirably (e.g., quickly, efficiently, reliably, enhancedly, or optimally) detect and mitigate (e.g., reduce, rectify, or minimize) degraded performance of such higher priority services, that can be due in part to congestion on the transport layer of the communication network 102 (e.g., particularly with regard to the network resources utilized for the higher priority QoS tag) and/or other undesirable conditions of the communication network 102.

The network monitor component 120 can communicate (e.g., automatically or dynamically communicate) update information relating to any updates (e.g., adjustments; or promotions or demotions) to respective QoS tag assignments for respective services (e.g., 114, 116, or 118) to the tag configuration component 212 of the core network 104 and/or the tag configuration component 216 of the base station 106. If one or more updates to QoS assignments are to be made at the core network side, the tag configuration component 212 of the core network 104 can update or reconfigure the assignment of one or more respective QoS tags associated with one or more respective services to assign one or more respective updated QoS tags to the one or more respective services based at least in part on the update information received from the network monitor component 120. If one or more updates to QoS assignments are to be made at the base station side, the tag configuration component 216 of the base station 106 can update or reconfigure the assignment of one or more respective QoS tags associated with one or more respective services to assign one or more respective updated QoS tags to the one or more respective services based at least in part on the update information received from the network monitor component 120.

The network monitor component 120 can continue to perform (e.g., automatically or dynamically perform), and can work in conjunction with other components (e.g., core network 104, base station 106, or other component), to test (e.g., automatically or dynamically test) or facilitate testing network performance of the communication network 102 with respect to services and associated QoS tags, and control (e.g., automatically, dynamically, and/or adaptively control, adjust, or update) assignments of respective QoS tags to respective services, and/or perform other operations, such as described herein.

With further regard to the processor component 208 and the data store 210, the processor component 208 can be associated with (e.g., communicatively connected to) and can work in conjunction with the other components (e.g., monitor component 202, tag manager component 204, test endpoint node 206, data store 210, and/or other component) to facilitate performing the various functions and operations of the network monitor component 120. The processor component 208 can employ one or more processors (e.g., one or more central processing units (CPUs)), microprocessors, or controllers that can process information relating to data, files, services, applications, tags (e.g., QoS tags or other tags), tag management, tag assignments, tag adjustments or updates, QoS levels or priority levels, QoS tag bans, test signals (e.g., TWAMP signals or other test signals), performance indicators (e.g., KPIs or other performance indicators), threshold performance indicator values, service specifications (e.g., SLAs or other types of service specifications), service performance information (e.g., service performance information itself, pivot or summary information derived therefrom, or service performance table), original QoS tag tables, current QoS tag tables, data processing operations, messages, notifications, alarms, alerts, preferences (e.g., user or client preferences), hash values, metadata, parameters, traffic flows, policies, defined tag management criteria, algorithms (e.g., enhanced tag management algorithms, hash algorithms, data compression algorithms, data decompression algorithms, and/or other algorithm), interfaces, protocols, tools, and/or other information, to facilitate operation of the network monitor component 120, and control data flow between the network monitor component 120 and/or other components (e.g., network components, the core network 104, base station 106, the communication network 102, a device (e.g., 108, 110, and/or 112), a node, a service (e.g., 114, 116, and/or 118), a user, or other entity) associated with the network monitor component 120.

The data store 210 can store data structures (e.g., user data, metadata), code structure(s) (e.g., modules, objects, hashes, classes, procedures) or instructions, information relating to data, files, services, applications, tags, tag management, tag assignments, tag adjustments or updates, QoS levels or priority levels, QoS tag bans, test signals, performance indicators, threshold performance indicator values, service specifications (e.g., SLAs or other types of service specifications), service performance information, original QoS tag tables, current QoS tag tables, data processing operations, messages, notifications, alarms, alerts, preferences (e.g., user or client preferences), hash values, metadata, parameters, traffic flows, policies, defined tag management criteria, algorithms (e.g., enhanced tag management algorithms, hash algorithms, data compression algorithms, data decompression algorithms, and/or other algorithm), interfaces, protocols, tools, and/or other information, to facilitate controlling or performing operations associated with the network monitor component 120. The data store 210 can comprise volatile and/or non-volatile memory, such as described herein. In an aspect, the processor component 208 can be functionally coupled (e.g., through a memory bus) to the data store 210 in order to store and retrieve information desired to operate and/or confer functionality, at least in part, to the monitor component 202, tag manager component 204, test endpoint node 206, data store 210, processor component 208, data store 210, and/or other component of the network monitor component 120, and/or substantially any other operational aspects of the network monitor component 120.

As disclosed, the data store 210 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In accordance with various embodiments, in addition to various other network equipment, the core network 104 can comprise a processor component 228 and a data store 230, and the base station 106 can comprise a processor component 232 and a data store 234. The processor component (e.g., 228 or 232) can be associated with (e.g., communicatively connected to) and can work in conjunction with the other components (e.g., tag configuration component, test endpoint node, data store, and/or other component) to facilitate performing the various functions and operations of the core network 104 or base station 106. The processor component (e.g., 228 or 232) can employ one or more processors (e.g., one or more central processing units (CPUs)), microprocessors, or controllers that can process information relating to data, files, services, applications, tags (e.g., QoS tags or other tags), tag assignments, tag adjustments or updates, QoS levels or priority levels, test signals, test messages, test response messages, performance indicators (e.g., KPIs or other performance indicators), threshold performance indicator values, service performance information, data processing operations, messages, notifications, alarms, alerts, preferences (e.g., user or client preferences), hash values, metadata, parameters, traffic flows, policies, defined tag management criteria, algorithms (e.g., enhanced tag management algorithms, hash algorithms, data compression algorithms, data decompression algorithms, and/or other algorithm), interfaces, protocols, tools, and/or other information, to facilitate operation of the core network 104 or base station 106, and control data flow between the core network 104, base station 106, and/or other components (e.g., other network components of the communication network 102, a device (e.g., 108, 110, and/or 112), a node, a service (e.g., 114, 116, and/or 118), a user, or other entity) associated with the core network 104 or base station 106.

The data store (e.g., 230 or 234) can store data structures (e.g., user data, metadata), code structure(s) (e.g., modules, objects, hashes, classes, procedures) or instructions, information relating to data, files, services, applications, tags (e.g., QoS tags or other tags), tag assignments, tag adjustments or updates, QoS levels or priority levels, test signals, test messages, test response messages, performance indicators, threshold performance indicator values, service performance information, data processing operations, messages, notifications, alarms, alerts, preferences (e.g., user or client preferences), hash values, metadata, parameters, traffic flows, policies, defined tag management criteria, algorithms (e.g., enhanced tag management algorithms, hash algorithms, data compression algorithms, data decompression algorithms, and/or other algorithm), interfaces, protocols, tools, and/or other information, to facilitate controlling or performing operations associated with the core network 104 or base station 106. The data store (e.g., 230 or 234) can comprise volatile and/or non-volatile memory, such as described herein. In an aspect, the processor component (e.g., 228 or 232) can be functionally coupled (e.g., through a memory bus) to the data store (e.g., 230 or 234) in order to store and retrieve information desired to operate and/or confer functionality, at least in part, to the tag configuration component, test endpoint node, processor component, data store, and/or other component of the core network 104 or base station 106, and/or substantially any other operational aspects of the core network 104 or base station 106.

Figure 3:
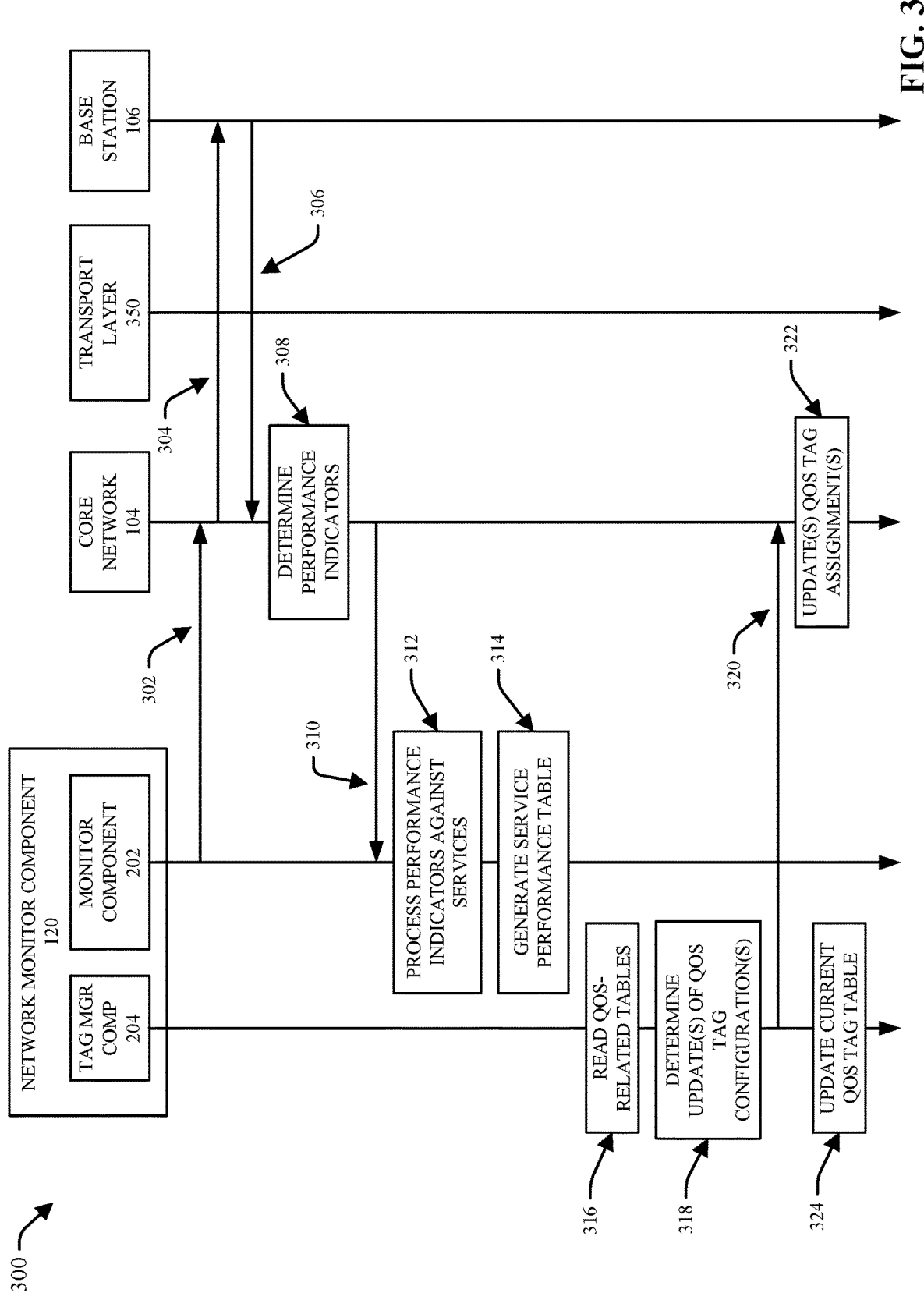
FIG. 3 illustrates a diagram of a non-limiting example process flow that can desirably manage and perform QoS tagging associated with services for downlink data traffic from the core network to the base station, in accordance with various aspects and embodiments of the disclosed subject matter.

Referring to FIG. 3 (along with FIGS. 1 and 2), FIG. 3 illustrates a diagram of a non-limiting example process flow 300 that can desirably (e.g., automatically, dynamically, efficiently, reliably, suitably, enhancedly, or optimally) manage and perform QoS tagging associated with services for downlink data traffic from the core network to the base station, in accordance with various aspects and embodiments of the disclosed subject matter. The example process flow 300 can relate to operations that can be performed by the core network 104, the base station 106, and/or the network monitor component 120. The example process flow 300 can be automatically, dynamically, or periodically be performed, if and as desired.

As indicated at reference numeral 302 of the example process flow 300, with regard to each QoS tag of a group of QoS tags, the monitor component 202 of the network monitor component 120 can initiate or trigger a test session for a QoS tag of the group of QoS tags by communicating a test signal relating to the QoS tag to the core network 104, such as described herein, wherein the QoS tag can be associated with a QoS level or priority level, and/or can be associated with a tag value (e.g., DSCP value or other tag value).

As indicated at reference numeral 304 of the example process flow 300, with regard to each QoS tag of the group of QoS tags, the test endpoint node 214 of the core network 104 can communicate a test message (e.g., a test data packet) associated with the QoS tag (e.g., with the QoS tag in the header information of the test data packet) to the test endpoint node 218 of the base station 106 via the transport layer 350, such as described herein. The routing, queuing, and/or data communication paths via the transport layer 350 for the test message can be determined and/or implemented based at least in part on the QoS tag (e.g., the QoS tag level or priority level, or the corresponding tag value, of the QoS tag).

As indicated at reference numeral 306 of the example process flow 300, with regard to each QoS tag of the group of QoS tags, the test endpoint node 218 of the base station

106 can communicate a test response message (e.g., a test response data packet) associated with the QoS tag (e.g., with the QoS tag in the header information of the test response data packet) to the test endpoint node 214 of the core network 104 via the transport layer 350, such as described herein. The routing, queuing, and/or data communication paths via the transport layer 350 for the test response message can be determined and/or implemented based at least in part on the QoS tag (e.g., the QoS tag level or priority level, or the corresponding tag value, of the QoS tag).

As indicated at reference numeral 308 of the example process flow 300, with regard to each QoS tag of the group of QoS tags, the test endpoint node 214 or other component of the core network 104 can determine, measure, or collect a group of performance indicators relating to performance of the communication network 102 (e.g., the core network 104, the base station 106, the transport layer 350, and/or other component) with respect to the communication of the test message and the test response message utilizing the QoS tag, such as described herein. As indicated at reference numeral 310 of the example process flow 300, the test endpoint node 214 or other component of the core network 104 can communicate information relating to the group of performance indicators relating to the network performance with respect to the QoS tag to the monitor component 202 of the network monitor component 120.

In response to receiving the information relating to the respective groups of performance indicators that relate to the respective network performance of the communication network 102 with respect to the respective QoS tags, as specified at reference numeral 312 of the example process flow 300, the monitor component 202 can process (e.g., analyze or evaluate) the information relating to the respective groups of performance indicators against the respective services (e.g., respective service specification information of the respective service specifications (e.g., SLAs) associated with the respective services), such as described herein. For instance, the monitor component 202 can analyze the respective groups of performance indicators against the respective groups of threshold performance indicator values associated with the respective service specifications associated with the respective services, and, based at least in part on the results of such analysis, can determine whether the respective groups of performance indicators associated with the respective QoS tags satisfy the respective groups of threshold performance indicator values associated with the respective service specifications associated with the respective services.

As specified at reference numeral 314 of the example process flow 300, the monitor component 202 can generate (e.g., write or create) a service performance table, based at least in part on the results of such analysis, and can store the service performance table in the data store 210 of the network monitor component 120. The service performance table can indicate which of the respective services did, can, or would have their respective service specifications satisfied, and/or which of the respective services did not, cannot, or would not have their respective service specifications satisfied, at the respective QoS tags (e.g., if and when utilizing the respective QoS tags).

As indicated at reference numeral 316 of the example process flow 300, the tag manager component 204 (TAG MGR COMP) of the network monitor component 120 can read QoS-related tables (e.g., the original QoS tag table associated with downlink data traffic and/or the core network 104 and the current QoS tag table associated with downlink data traffic and/or the core network 104) from the data store 210. The original QoS tag table can comprise information relating to respective assignments of respective original (e.g., original, baseline, or non-promoted) QoS tags to respective services with respect to downlink data traffic that can be communicated from the core network 104 to the base station 106. The current QoS tag table can comprise information relating to respective assignments of respective current (e.g., most recent) QoS tags to the respective services with respect to downlink data traffic that can be communicated from the core network 104 to the base station 106.

As specified at reference numeral 318 of the example process flow 300, the tag manager component 204 can determine (e.g., compute) one or more respective updates (e.g., adjustments) of one or more respective QoS tag configurations associated with one or more of the respective services, based at least in part on the results of analyzing the respective information contained in the service performance table, the original QoS tag table, and the current QoS tag table. For instance, the tag manager component 204 can determine one or more respective updates (e.g., adjustments) of one or more respective QoS tag assignments of one or more respective QoS tags to the one or more respective services, based at least in part on the results of analyzing the respective information contained in the service performance table, the original QoS tag table, and the current QoS tag table, such as described herein. The one or more respective updates can comprise or relate to promoting a service from its original QoS tag to a higher QoS tag, demoting a service from a higher to its original QoS tag, or temporarily banning one or more services (e.g., lower priority services) from being promoted from their original QoS tags to a higher QoS tag (e.g., associated with a higher priority service determined to be degraded), in accordance with the defined tag management criteria, such as described herein.

As indicated at reference numeral 320 of the example process flow 300, the tag manager component 204 of the network monitor component 120 can communicate update information, which can relate to the one or more respective updates of the respective QoS tag configurations associated with the one or more of the respective services, to the core network 104. As indicated at reference numeral 322 of the example process flow 300, the tag configuration component 212 of the core network 104 can reset, reconfigure, or update the one or more respective QoS tag assignments of the one or more respective QoS tags to the one or more respective services, based at least in part on (e.g., in accordance with) the one or more updates indicated in the update information.

As specified at reference numeral 324 of the example process flow 300, the tag manager component 204 of the network monitor component 120 can update the current QoS tag table associated with downlink data traffic and/or the core network 104 in the data store 210, based at least in part on the one or more respective updates of one or more respective QoS tag assignments of the one or more respective QoS tags to the one or more respective services. For instance, the tag manager component 204 can update or write information relating to the one or more respective updates of one or more respective QoS tag assignments to the current QoS tag table to update the current QoS tag table, and can store the updated current QoS tag table associated with downlink data traffic and/or the core network 104 in the data store 210 (e.g., in the database in the data store 210).

Figure 4:
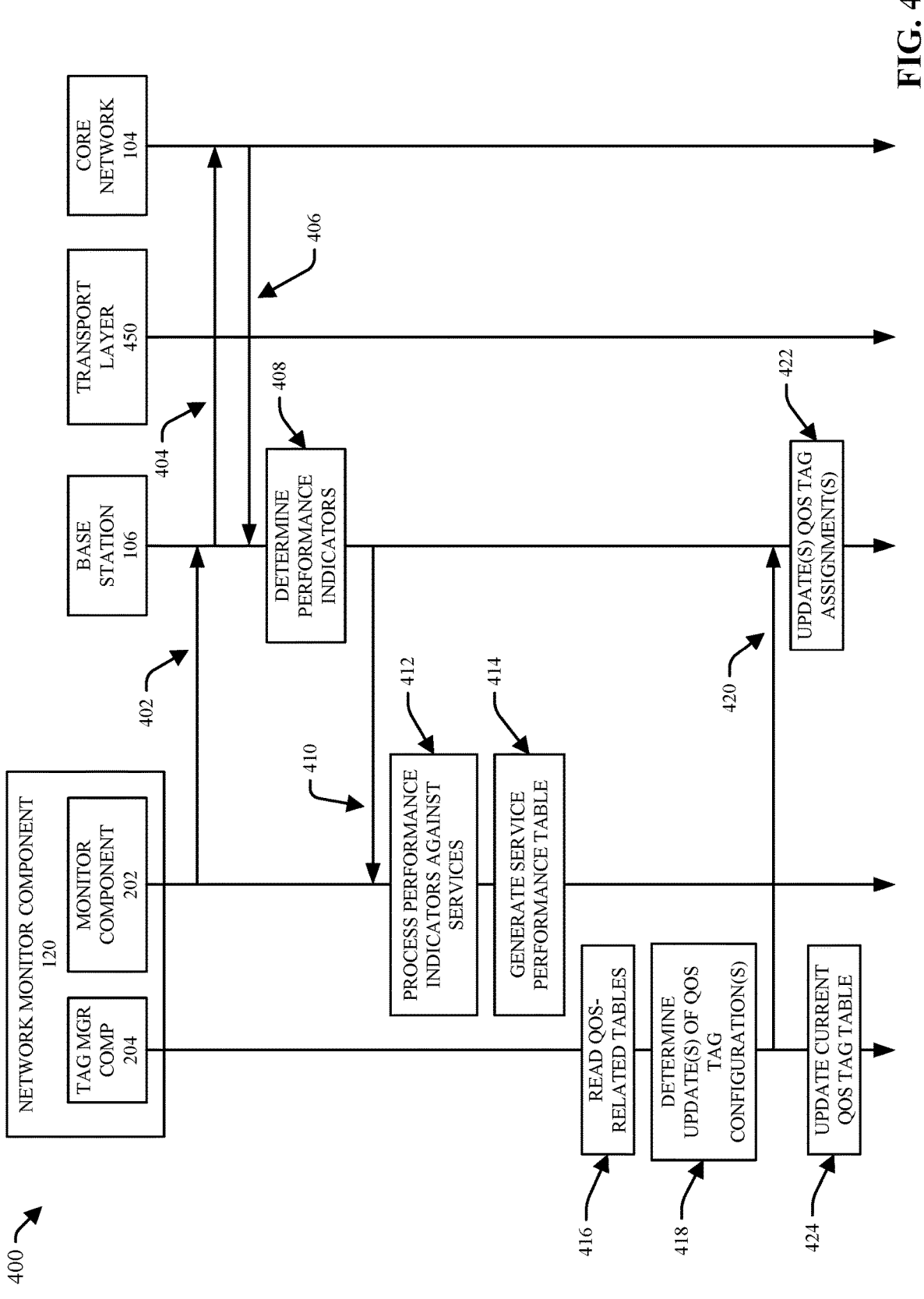
FIG. 4 depicts a diagram of a non-limiting example process flow that can desirably manage and perform QoS tagging associated with services for uplink data traffic from the base station to the core network, in accordance with various aspects and embodiments of the disclosed subject matter.

Turning to FIG. 4 (along with FIGS. 1 and 2), FIG. 4 depicts a diagram of a non-limiting example process flow 400 that can desirably (e.g., automatically, dynamically, efficiently, reliably, suitably, enhancedly, or optimally) manage and perform QoS tagging associated with services for uplink data traffic from the base station to the core network, in accordance with various aspects and embodiments of the disclosed subject matter. The example process flow 400 can relate to operations that can be performed by the core network 104, the base station 106, and/or the network monitor component 120. The example process flow 400 can be automatically, dynamically, or periodically be performed, if and as desired.

As indicated at reference numeral 402 of the example process flow 400, with regard to each QoS tag of a group of QoS tags, the monitor component 202 of the network monitor component 120 can initiate or trigger a test session for a QoS tag of the group of QoS tags by communicating a test signal relating to the QoS tag to the base station 106, such as described herein, wherein the QoS tag can be associated with a QoS level or priority level, and/or can be associated with a tag value (e.g., DSCP value or other tag value).

As indicated at reference numeral 404 of the example process flow 400, with regard to each QoS tag of the group of QoS tags, the test endpoint node 218 of the base station 106 can communicate a test message (e.g., a test data packet) associated with the QoS tag (e.g., with the QoS tag in the header information of the test data packet) to the test endpoint node 214 of the core network 104 via the transport layer 450, such as described herein. The routing, queuing, and/or data communication paths via the transport layer 450 for the test message can be determined and/or implemented based at least in part on the QoS tag (e.g., the QoS tag level or priority level, or the corresponding tag value, of the QoS tag).

As indicated at reference numeral 406 of the example process flow 400, with regard to each QoS tag of the group of QoS tags, the test endpoint node 214 of the core network 104 can communicate a test response message (e.g., a test response data packet) associated with the QoS tag (e.g., with the QoS tag in the header information of the test response data packet) to the test endpoint node 218 of the base station 106 via the transport layer 450, such as described herein. The routing, queuing, and/or data communication paths via the transport layer 450 for the test response message can be determined and/or implemented based at least in part on the QoS tag (e.g., the QoS tag level or priority level, or the corresponding tag value, of the QoS tag).

As indicated at reference numeral 408 of the example process flow 400, with regard to each QoS tag of the group of QoS tags, the test endpoint node 218 or other component of the base station 106 can determine, measure, or collect a group of performance indicators relating to performance of the communication network 102 (e.g., the core network 104, the base station 106, the transport layer 450, and/or other component) with respect to the communication of the test message and the test response message utilizing the QoS tag, such as described herein. As indicated at reference numeral 410 of the example process flow 400, the test endpoint node 218 or other component of the base station 106 can communicate information relating to the group of performance indicators relating to the network performance with respect to the QoS tag to the monitor component 202 of the network monitor component 120.

In response to receiving, from the base station 106, the information relating to the respective groups of performance indicators that relate to the respective network performance of the communication network 102 with respect to the respective QoS tags, as specified at reference numeral 412 of the example process flow 400, the monitor component 202 can process (e.g., analyze or evaluate) the information relating to the respective groups of performance indicators against the respective services (e.g., respective service specification information of the respective service specifications (e.g., SLAs) associated with the respective services), such as described herein. For instance, the monitor component 202 can analyze the respective groups of performance indicators against the respective groups of threshold performance indicator values associated with the respective service specifications associated with the respective services, and, based at least in part on the results of such analysis, can determine whether the respective groups of performance indicators associated with the respective QoS tags satisfy the respective groups of threshold performance indicator values associated with the respective service specifications associated with the respective services.

As specified at reference numeral 414 of the example process flow 400, the monitor component 202 can generate (e.g., write or create) a service performance table, based at least in part on the results of such analysis, and can store the service performance table in the data store 210 of the network monitor component 120. The service performance table can indicate which of the respective services did, can, or would have their respective service specifications satisfied, and/or which of the respective services did not, cannot, or would not have their respective service specifications satisfied, at the respective QoS tags (e.g., if and when utilizing the respective QoS tags).

As indicated at reference numeral 416 of the example process flow 400, the tag manager component 204 of the network monitor component 120 can read the original QoS tag table associated with uplink data traffic and/or the base station 106 and the current QoS tag table associated with uplink data traffic and/or the base station 106 from the data store 210. The original QoS tag table can comprise information relating to respective assignments of respective original (e.g., original, baseline, or non-promoted) QoS tags to respective services with respect to uplink data traffic that can be communicated from the base station 106 to the core network 104. The current QoS tag table can comprise information relating to respective assignments of respective current (e.g., most recent) QoS tags to the respective services with respect to uplink data traffic that can be communicated from the base station 106 to the core network 104.

As specified at reference numeral 418 of the example process flow 400, the tag manager component 204 can determine (e.g., compute) one or more respective updates (e.g., adjustments) of one or more respective QoS tag configurations associated with one or more of the respective services, based at least in part on the results of analyzing the respective information contained in the service performance table, the original QoS tag table, and the current QoS tag table. For instance, the tag manager component 204 can determine one or more respective updates (e.g., adjustments) of one or more respective QoS tag assignments of one or more respective QoS tags to the one or more respective services, based at least in part on the results of analyzing the respective information contained in the service performance table, the original QoS tag table, and the current QoS tag table, such as described herein. The one or more respective updates can comprise or relate to promoting a service from its original QoS tag to a higher QoS tag, demoting a service from a higher to its original QoS tag, or temporarily banning one or more services (e.g., lower priority services) from being promoted from their original QoS tags to a higher QoS tag (e.g., associated with a higher priority service determined to be degraded), in accordance with the defined tag management criteria, such as described herein.

As indicated at reference numeral 420 of the example process flow 400, the tag manager component 204 of the network monitor component 120 can communicate update information, which can relate to the one or more respective updates of the respective QoS tag configurations associated with the one or more of the respective services, to the base station 106. As indicated at reference numeral 422 of the example process flow 400, the tag configuration component 216 of the base station 106 can reset, reconfigure, or update the one or more respective QoS tag assignments of the one or more respective QoS tags to the one or more respective services, based at least in part on (e.g., in accordance with) the one or more updates indicated in the update information.

As specified at reference numeral 424 of the example process flow 400, the tag manager component 204 of the network monitor component 120 can update the current QoS tag table associated with uplink data traffic and/or the base station 106 in the data store 210, based at least in part on the one or more respective updates of one or more respective QoS tag assignments of the one or more respective QoS tags to the one or more respective services. For instance, the tag manager component 204 can update or write information relating to the one or more respective updates of one or more respective QoS tag assignments to the current QoS tag table to update the current QoS tag table associated with uplink data traffic and/or the base station 106, and can store the updated current QoS tag table associated with uplink data traffic and/or the base station 106 in the data store 210 (e.g., in the database in the data store 210).

It is to be appreciated and understood that, in accordance with various embodiments, the example process flow 300 of FIG. 3 and the example process flow of FIG. 4 can be performed or executed independently (e.g., at a same or different time), simultaneously or substantially simultaneously, concurrently, or in parallel of or with each other.

Figure 5:
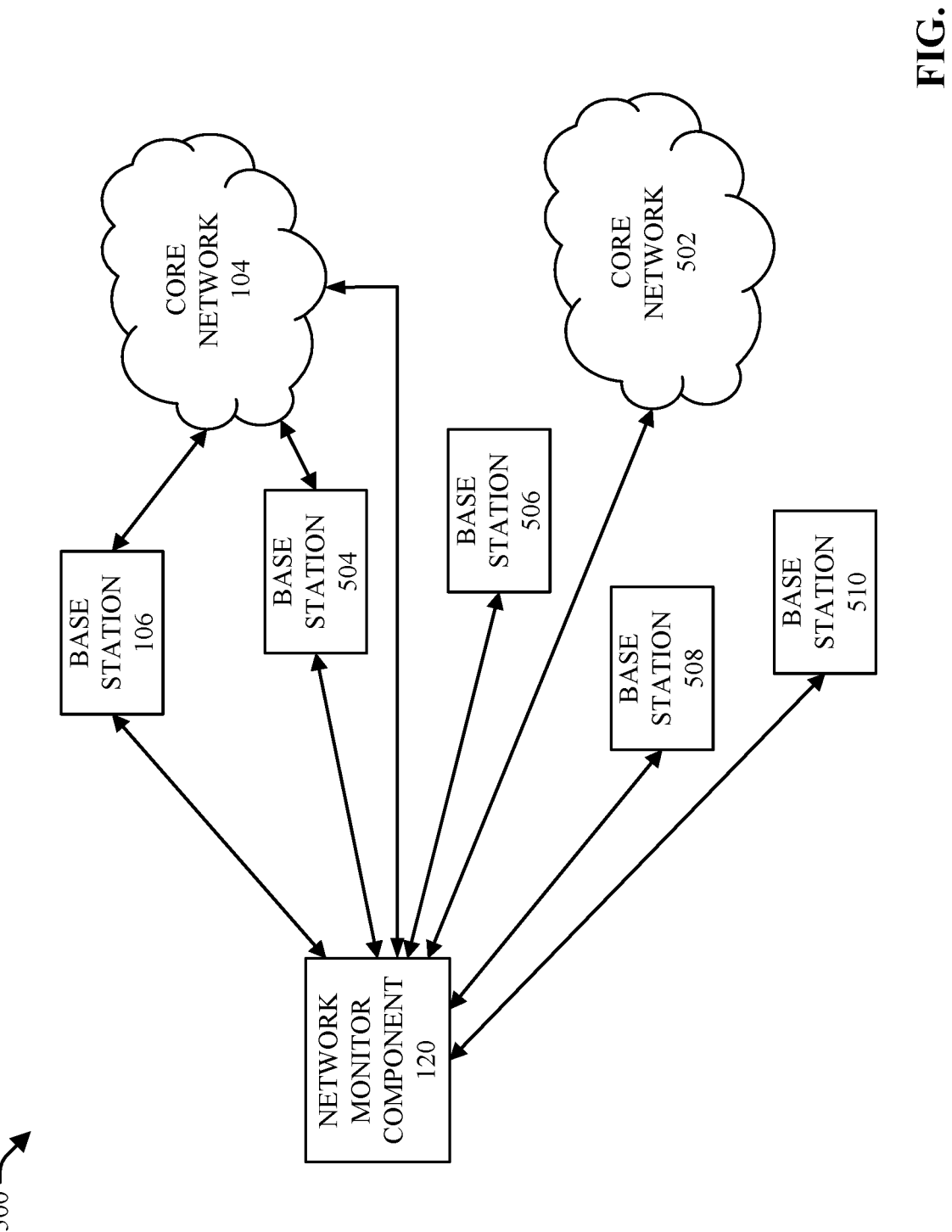
FIG. 5 illustrates a diagram of a non-limiting example system that can desirably manage and perform QoS tagging associated with services with respect to one or more core networks and one or more base stations, in accordance with various aspects and embodiments of the disclosed subject matter.

Referring to FIG. 5, FIG. 5 illustrates a diagram of a non-limiting example system 500 that can desirably (e.g., automatically, dynamically, efficiently, reliably, suitably, enhancedly, or optimally) manage and perform QoS tagging associated with services with respect to one or more core networks and one or more base stations, in accordance with various aspects and embodiments of the disclosed subject matter. The system 500 can comprise the network monitor component 120, the core network 104, a core network 502, the base station 106, and base stations 504, 506, 508, and 510.

The base stations 106 and 504 can be associated with (e.g., communicatively connected to) the core network 104. The base stations 506, 508, and 510 can be associated with (e.g., communicatively connected to) the core network 502. The network monitor component 120 can be associated with (e.g., communicatively connected to) the core networks 104 and 502, and the base stations 106, 504, 506, 508, and 510.

In accordance with various embodiments, the network monitor component 120 can operate in conjunction with the core networks 104 and 502, and the base stations 106, 504, 506, 508, and 510 to perform respective testing (e.g., TWAMP testing or other type of testing) of respective network performance (e.g., respective transport layers, respective core networks, and respective base stations) with regard to respective services associated with respective QoS tags, in accordance with the defined tag management criteria. The network monitor component 120 also can determine, generate, and/or update respective service performance information (e.g., service performance information itself, or respective service performance tables or other type of service performance information derived therefrom), respective original QoS tag information (e.g., respective original QoS tag tables), respective current QoS tag information (e.g., respective current QoS tag tables), and/or other respective information associated with the respective services and/or the respective QoS tags with respect to the core network 104, the core network 502, the base station 106, the base station 504, the base station 506, the base station 508, and the base station 510, and with respect to uplink data communication paths and downlink data communication paths associated with the respective transport layers. For instance, based at least in part on respective performance indicators that can be determined from the results of the respective testing, the network monitor component 120 can determine, generate, and/or update respective service performance information associated with the respective services and/or the respective QoS tags with respect to the core network 104, the core network 502, the base station 106, the base station 504, the base station 506, the base station 508, and the base station 510.

The network monitor component 120 can manage respective QoS tag assignments and determine respective updates (e.g., adjustments) to assignments of respective QoS tags to respective services based at least in part on the respective service performance information (e.g., the respective service performance tables), the respective original QoS tag information (e.g., the respective original QoS tag tables), the respective current QoS tag information (e.g., the respective current QoS tag tables), and/or the other respective information associated with the core network 104, core network 502, base station 106, base station 504, base station 506, base station 508, and base station 510, in accordance with the defined tag management criteria. The network monitor component 120 can communicate respective update information relating to the respective updates to the assignments of the respective QoS tags to the respective services to the core network 104, core network 502, base station 106, base station 504, base station 506, base station 508, and base station 510.

The core network 104, core network 502, base station 106, base station 504, base station 506, base station 508, and base station 510 (e.g., employing their respective tag configuration components) can respectively update, reset, or reconfigure the assignments of the respective QoS tags to the respective services based at least in part on the respective update information received from the network monitor component 120.

It is to be appreciated and understood that one or more components (e.g., devices, the network monitor component, the base station, the core network, or other component) of the systems (e.g., system 100, system 200, or system 500), process flows (e.g., process flow 300 or process flow 400), or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 that can desirably (e.g., automatically, dynamically, efficiently, suitably, enhancedly, or optimally) manage QoS tagging associated with services, in accordance with various aspects and embodiments of the disclosed subject matter. The method 600 can be employed by, for example, a system (e.g., the network monitoring system) comprising the network monitor component, which can comprise the monitor component, the tag manager component, the processor component, the data store, and/or other components.

At 602, respective network performance levels associated with respective QoS tags can be determined based at least in part on respective network responses of network equipment to respective test messages associated with the respective QoS tags, wherein the respective QoS tags can be associated with respective services and can comprise a first QoS tag associated with a service and a second QoS tag. The monitor component can communicate respective test signals (e.g., TWAMP signals, or other test signals) associated with the respective QoS tags and/or the respective services to the base station and/or the core network to trigger performance of respective tests associated with the respective QoS tags and/or the respective services. In response to the respective test signals, the base station (e.g., a test endpoint node of the base station) can communicate respective test messages associated with the respective QoS tags and/or the respective services to the core network (e.g., a test endpoint node of the core network), and, in response, the core network can communicate respective test response messages associated with the respective QoS tags and/or the respective services to the base station; and/or the core network can communicate respective test messages associated with the respective QoS tags and/or the respective services to the base station, and, in response, the base station can communicate respective test response messages associated with the respective QoS tags and/or the respective services to the core network.

The tag manager component can receive the respective network responses (e.g., network response information relating to the respective network responses, such as respective performance indicators) to the respective test messages from the base station and/or the core network. The monitor component can determine the respective network performance levels associated with the respective QoS tags based at least in part on the respective network responses of the network equipment and transport layer to the respective test messages. The respective network performance levels can be, can comprise, can relate to, or can correspond to respective groups of performance indicators (e.g., respective groups of KPIs) associated with the respective QoS tags and/or respective services, such as described herein. The network equipment can comprise network equipment of the core network and/or a base station associated with the core network.

At 604, based at least in part on the respective network performance levels associated with the respective QoS tags, a determination can be made regarding whether to adjust a QoS tag assignment for the service from the first QoS tag of a first quality of service level to the second QoS tag of a second quality of service level that can be different from the first QoS level. The tag manager component can determine whether to adjust the QoS tag assignment for the service from the first QoS tag of the first QoS level to the second QoS tag of the second QoS level based at least in part on the respective network performance levels associated with the respective QoS tags. In certain embodiments, the tag manager component can analyze or query the service performance table relating to the QoS tags and services, which can be generated based at least in part on respective performance indicator values, associated with the respective QoS tags and/or respective services, and corresponding (e.g., applicable or associated) respective threshold performance indicator values associated with the respective QoS tags and/or respective services, and, from the analysis or querying of the service performance table, can determine whether to adjust the QoS tag assignment for the service from the first QoS tag of the first QoS level to the second QoS tag of the second QoS level, such as described herein. In some embodiments, the monitor component, the tag manager component, or another component or entity, can determine the respective threshold performance indicator values associated with the respective QoS tags and/or respective services based at least in part on respective SLAs and/or other service specifications associated with the respective services.

As an example of determining whether to adjust a QoS tag assignment, if the service is a relatively lower priority service and the first QoS tag associated with the service is lower (e.g., has a lower priority level in this example instance) than the second QoS tag, and the network performance level associated with the first QoS tag is determined to be degraded (e.g., the network performance level associated with the first QoS tag is determined to be in violation of the applicable SLA for the service), the tag manager component can determine whether to adjust the QoS tag assignment for the service from the first QoS tag of the first QoS level to the second QoS tag of the second QoS level, in accordance with the defined tag management criteria, such as described herein. For instance, if a first network performance level associated with the first QoS tag is determined to be degraded (e.g., the first network performance level associated with the first QoS tag is determined to be in violation of the applicable SLA for the service), a second network performance level associated with the second QoS tag is determined to be acceptable (e.g., the second network performance level associated with the second QoS tag is determined to be in compliance with the applicable SLA for the service), and the service is not subject to a ban from being transitioned to the second QoS tag, the tag manager component can determine that the QoS tag assignment for the service can be adjusted from the first (e.g., original) QoS tag of the first QoS level to the second QoS tag of the second QoS level (e.g., relatively higher level), based at least in part on the first and second network performance levels associated with the first and second QoS tags, respectively, in accordance with the tag management criteria, such as described herein.

As another example, if the service is a relatively lower priority service and the first QoS tag of the first QoS level associated with the service is higher (e.g., is a relatively higher priority level) than the second QoS tag of the second QoS level (e.g., the original QoS level for the service in this example instance) due to a previous QoS tag promotion, the tag manager component can determine whether to adjust the QoS tag assignment for the service from the first QoS tag of the first QoS level to the second (e.g., original) QoS tag of the second QoS level (e.g., relatively lower level), based at least in part on the respective network performance levels associated with the respective QoS tags (e.g., the first and second network performance levels associated with the first and second QoS tags, respectively), in accordance with the defined tag management criteria, such as described herein. For instance, if a first network performance level associated with the first QoS tag is determined to be acceptable (e.g., the network performance level associated with the first QoS tag is determined to be in compliance with or to satisfy the applicable SLA for the service), and a second network performance level associated with the second QoS tag also is determined to be acceptable, the tag manager component can determine that the QoS tag assignment for the service can be adjusted from the first QoS tag of the first QoS level to the second (e.g., original) QoS tag of the second QoS level (e.g., relatively lower level), based at least in part on the first and second network performance levels associated with the first and second QoS tags, respectively, in accordance with the tag management criteria, such as described herein.

As still another example, if the service is a relatively lower priority service and the first QoS tag of the first QoS level associated with the service is higher (e.g., is a relatively higher priority level in this example instance) than the second QoS tag of the second QoS level (e.g., the original QoS level for the service) due to a previous QoS tag promotion, and a higher priority service also is associated with the first QoS tag, the tag manager component can determine whether to adjust the QoS tag assignment for the service from the first QoS tag of the first QoS level to the second QoS tag (e.g., original QoS tag for the service) of the second QoS level (e.g., relatively lower level), based at least in part on whether the network performance level associated with the first QoS tag is determined to be acceptable (e.g., whether the network performance level associated with the first QoS tag is determined to be in compliance with or to satisfy the applicable SLA for the service), in accordance with the tag management criteria, such as described herein. For instance, if the network performance level associated with the first QoS tag is determined to be unacceptable (e.g., the network performance level associated with the first QoS tag is determined to be degraded and not in compliance with the applicable SLA for the service), to facilitate improving the network performance level for the higher priority service associated with the first QoS tag, the tag manager component can determine that the QoS tag assignment for the service can be adjusted from the first QoS tag of the first QoS level to the second (e.g., original) QoS tag of the second QoS level (e.g., relatively lower level), in accordance with the defined tag management criteria, such as described herein.

Figure 7:
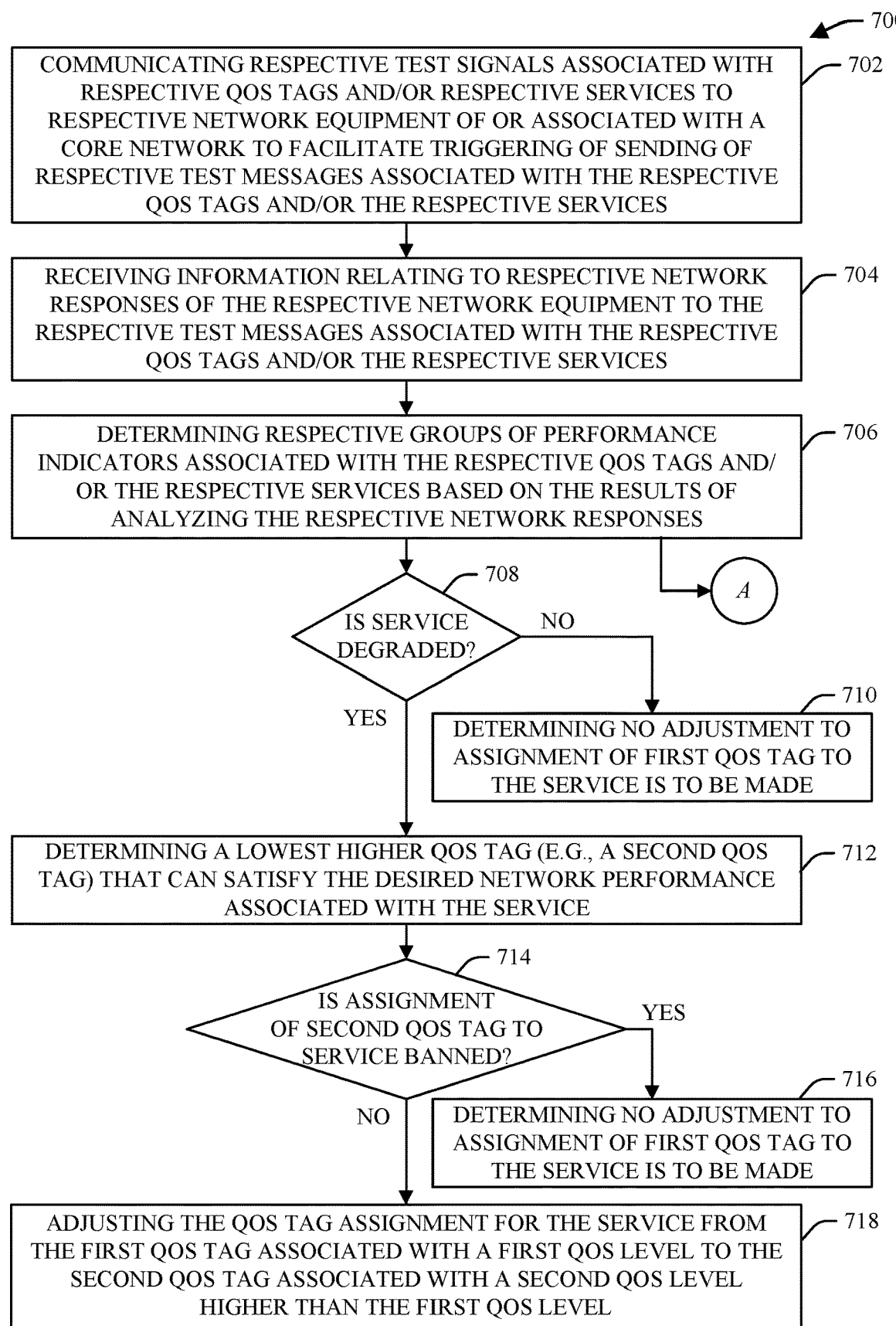
FIG. 7 depicts a flow chart of an example method that can desirably manage QoS tagging associated with services, including managing adjustment of a QoS tag assignment associated with a service by determining whether to promote the service to a higher QoS level tag from a lower QoS level and/or original QoS tag, in accordance with various aspects and embodiments of the disclosed subject matter.

FIG. 7 depicts a flow chart of an example method 700 that can desirably (e.g., automatically, dynamically, efficiently, suitably, enhancedly, or optimally) manage QoS tagging associated with services, including managing adjustment of a QoS tag assignment associated with a service by determining whether to promote the service to a higher QoS level tag from a lower QoS level and/or original QoS tag, in accordance with various aspects and embodiments of the disclosed subject matter. The method 700 can be employed by, for example, a system (e.g., the network monitoring system) comprising the network monitor component, which can comprise the monitor component, the tag manager component, the processor component, the data store, and/or other components.

At 702, respective test signals associated with respective QoS tags and/or respective services can be communicated to respective network equipment of or associated with a core network to facilitate triggering of sending of respective test messages associated with the respective QoS tags and/or the respective services. The monitor component can communicate the respective test signals associated with the respective QoS tags and/or the respective services to the respective network equipment of or associated with the core network, wherein the respective network equipment can comprise, for example, a base station associated with the core network or other network equipment of the core network. In response to the respective test signals, the base station (e.g., a test endpoint node of the base station) can communicate respective test messages associated with the respective QoS tags and/or the respective services to the core network (e.g., a test endpoint node of the core network), and, in response, the core network can communicate respective test response messages associated with the respective QoS tags and/or the respective services to the base station; and/or the core network can communicate respective test messages associated with the respective QoS tags and/or the respective services to the base station, and, in response, the base station can communicate respective test response messages associated with the respective QoS tags and/or the respective services to the core network.

At 704, information relating to respective network responses of the respective network equipment to the respective test messages associated with the respective QoS tags and/or the respective services can be received. For instance, the monitor component can receive, from the respective network equipment, the information (e.g., respective performance indicators) relating to the respective network responses of the respective network equipment (e.g., the base station and/or the core network) to the respective test messages associated with the respective QoS tags and/or the respective services.

At 706, respective groups of performance indicators associated with the respective QoS tags and/or the respective services can be determined based at least in part on the results of analyzing the information relating to the respective network responses of the respective network equipment to the respective test messages. The monitor component can determine respective network performance levels associated with the respective QoS tags based at least in part on the respective network responses of the respective network equipment and transport layer to the respective test messages. The respective network performance levels can be, can comprise, can relate to, or can correspond to respective groups of performance indicators (e.g., respective groups of KPIs) associated with the respective QoS tags and/or respective services, such as described herein. For instance, the monitor component can determine the respective groups of performance indicators associated with the respective QoS tags and/or the respective services based at least in part on the results of analyzing the information relating to the respective network responses of the respective network equipment to the respective test messages.

Figure 8:
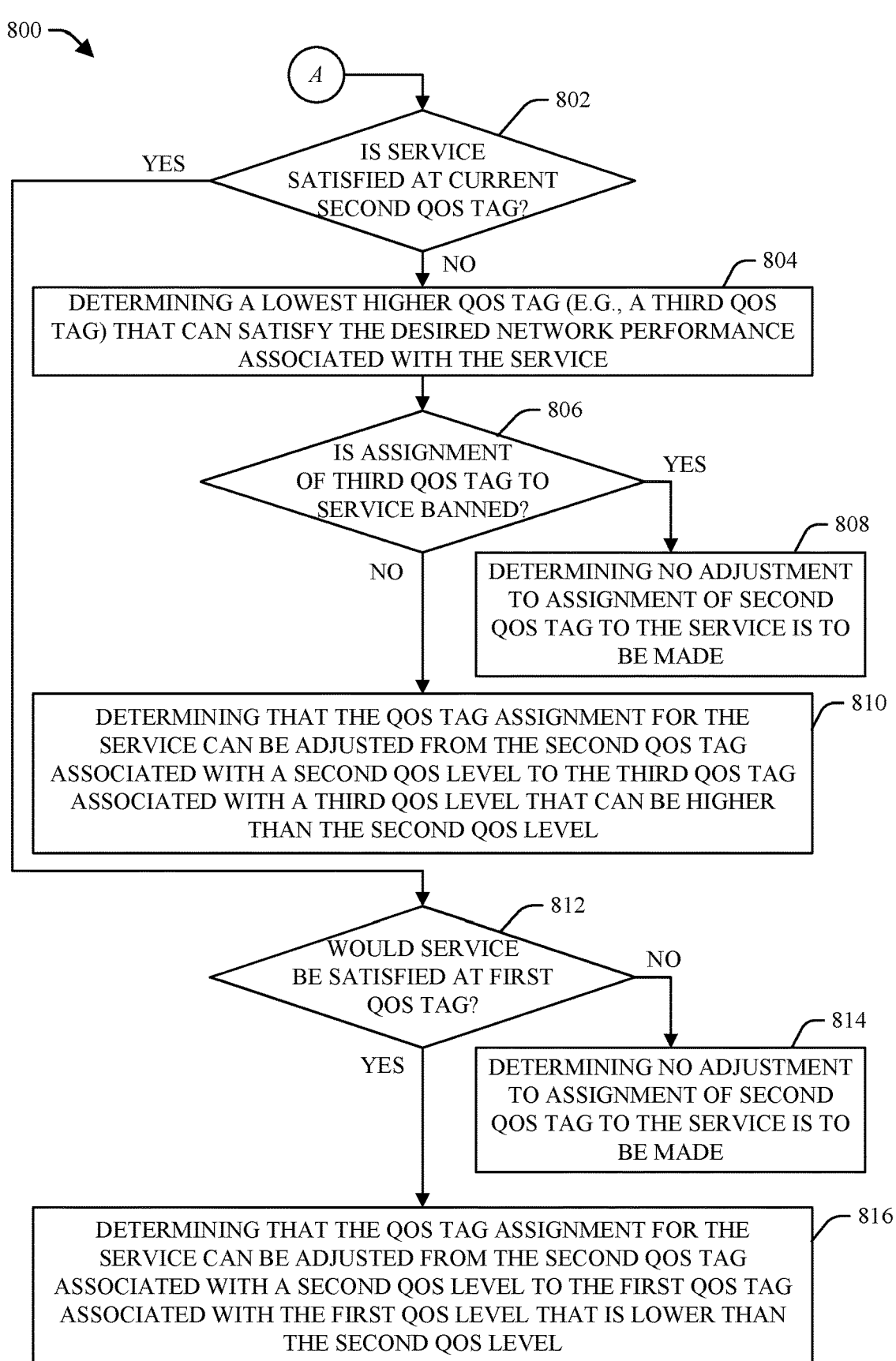
FIG. 8 illustrates a flow chart of an example method that can desirably manage QoS tagging associated with services, including managing adjustment of a QoS tag assignment associated with a service by determining whether to demote the service to a lower QoS level and original QoS tag from a higher QoS level and/or promoted QoS tag, in accordance with various aspects and embodiments of the disclosed subject matter.

In some embodiments, at this point, the method 700 can proceed to reference numeral 708, such as described herein and shown in FIG. 7. In other embodiments, at this point, the method 700 can proceed to reference point A, wherein method 800 of FIG. 8 and/or method 900 of FIG. 9 can proceed from reference point A, such as described herein and as shown in FIGS. 8 and 9.

At 708, with regard to each service of the respective services that has an original or non-promoted QoS tag, a determination can be made regarding whether the service is degraded based at least in part on information relating to respective performance indicator values of respective performance indicators of the group of performance indicators associated with the service and/or a first QoS tag associated with the service, and respective threshold performance indicator values associated with the respective performance indicators, the service, and/or the first QoS tag, wherein the first QoS tag can be an original or non-promoted QoS tag associated with the service. In some embodiments, with regard to each service that has an original or non-promoted QoS tag, the tag manager component can determine whether the service is degraded based at least in part on the information relating to the respective performance indicator values of the respective performance indicators associated with the service and/or the first QoS tag, and the respective threshold performance indicator values associated with the respective performance indicators, the service, and/or the first QoS tag. For instance, with regard to each such service, the tag manager component can determine whether any of the respective performance indicator values do not satisfy any of the corresponding (e.g., applicable or associated) respective threshold performance indicator values, based at least in part on the results of comparing the respective threshold performance indicator values to the corresponding respective threshold performance indicator values. In certain embodiments, the tag manager component can analyze or query the service performance table relating to the QoS tags and services, which can be generated based at least in part on the respective performance indicator values and the corresponding (e.g., applicable or associated) respective threshold performance indicator values, and, from the analysis or querying of the service performance table, can determine whether the service is degraded, such as described herein.

At 710, with regard to each service (e.g., each service that has an original or non-promoted QoS tag), in response to determining that the service is not degraded, a determination can be made that no adjustment to assignment of the first QoS tag to the service is to be made. For instance, with regard to the service under consideration, if the tag manager component determines that the service is not degraded, the tag manager component can determine that no adjustment is to be made to the assignment of the first QoS tag to the service, at least at this time. For example, if (e.g., based at least in part on the comparison results) the tag manager component determines that the respective performance indicator values satisfy the respective threshold performance indicator values (e.g., none of the indicator values fail to satisfy its respective or corresponding threshold performance indicator value), the tag manager component can determine that the service is not degraded and, accordingly, no adjustment is to be made to the assignment of the first QoS tag to the service, at least at this time. Thereafter, the monitor component and the tag manager component can continue to monitor and evaluate network performance with respect to each of the services, such as described herein.

With regard to each service (e.g., each service that has an original or non-promoted QoS tag), if, instead, at reference numeral 708, it is determined that the service is degraded, at 712, a lowest higher QoS tag (e.g., a second QoS tag) that can satisfy the desired network performance associated with the service can be determined based at least in part on an analysis of information relating to the respective groups of performance indicators associated with the respective QoS tags. For instance, based at least in part on an analysis of information relating to the respective groups of performance indicators associated with the respective QoS tags (e.g., analysis of the service performance table relating to QoS tags and services, and/or the respective groups of performance indicators themselves in relation to the respective groups of threshold performance indicator values), the tag manager component can determine the lowest higher QoS tag (e.g., a higher QoS tag than the first QoS tag that can be the lowest higher QoS level) that can satisfy (e.g., can meet or exceed; can be at or greater than) the desired network performance associated with the service such that the respective threshold performance indicator values associated with such lowest QoS tag can satisfy the respective threshold performance indicator values associated with the service. The lowest higher QoS tag can be higher (e.g., can have a higher QoS level or priority level) than the first QoS tag, but can be lower (e.g., can have a lower QoS level or priority level) than other higher QoS tags that also can satisfy the desired network performance associated with the service.

With regard to each service (e.g., each service that has an original or non-promoted QoS tag) that is determined to be degraded, at 714, a determination can be made regarding whether assignment of the second QoS tag (e.g., the lowest higher QoS tag that can satisfy the desired network performance associated with the service) to the service is banned (e.g., currently banned for a defined time period). For instance, the tag manager component can determine whether assignment of the second QoS tag (e.g., the lowest higher QoS tag that can satisfy the desired network performance associated with the service) to the service is subject to a ban for a defined time period that is still in place (e.g., that has not yet expired), such as described herein.

With regard to each service (e.g., each service that has an original or non-promoted QoS tag) that is determined to be degraded, if it is determined that assignment of the second QoS tag to the service is subject to the ban for the defined time period (which has not yet expired), at 716, a determination can be made that no adjustment to the assignment of the first QoS tag to the service is to be made, at least at this time. For instance, if the tag manager component determines that assignment of the second QoS tag to the service is subject to the ban for the defined time period (which has not yet expired), the tag manager component can determine that the second QoS tag cannot be assigned to the service, and no adjustment to the assignment of the first QoS tag to the service is to be made, at least at this time. At this point, the monitor component and the tag manager component can continue to monitor and evaluate network performance with respect to each of the services, such as described herein.

With regard to each service (e.g., each service that has an original or non-promoted QoS tag) that is determined to be degraded, if, instead, at reference numeral 714, it is determined that the assignment of the second QoS tag to the service is not subject to a ban (at that time), at 718, the QoS tag assignment for the service can be adjusted from the first QoS tag associated with a first QoS level to the second QoS tag associated with a second QoS level that is higher than the first QoS level. For instance, if the tag manager component determines that the assignment of the second QoS tag to the service is not subject to a ban (at that time), the tag manager component can adjust the assignment for the service from the first QoS tag associated with the first QoS level to the second (e.g., higher or lowest higher) QoS tag associated with the second QoS level. At this point, the monitor component and the tag manager component can continue to monitor and evaluate network performance with respect to each of the services, such as described herein.

FIG. 8 illustrates a flow chart of an example method 800 that can desirably (e.g., automatically, dynamically, efficiently, suitably, enhancedly, or optimally) manage QoS tagging associated with services, including managing adjustment of a QoS tag assignment associated with a service by determining whether to demote the service to a lower QoS level and original QoS tag from a higher QoS level and/or promoted QoS tag, in accordance with various aspects and embodiments of the disclosed subject matter. The method 800 can be employed by, for example, a system (e.g., the network monitoring system) comprising the network monitor component, which can comprise the monitor component, the tag manager component, the processor component, the data store, and/or other components. In some embodiments, the method 800 can proceed from reference point A, wherein reference point A can stem from the method 700 of FIG. 7, as described herein.

At 802, with regard to each service of the respective services that currently has a second QoS tag as a promoted QoS tag (e.g., a QoS tag at a higher QoS level than the original QoS tag originally assigned for that service), a determination can be made regarding whether the service is satisfied (e.g., not degraded) at its current second QoS tag based at least in part on the information relating to respective performance indicator values of respective performance indicators of the group of performance indicators associated with the service and/or the second QoS tag associated with the service, and the respective threshold performance indicator values associated with the respective performance indicators, the service, and/or the second QoS tag, wherein the second QoS tag can be a promoted and/or higher QoS level QoS tag associated with the service. In some embodiments, with regard to each service that currently has the second QoS tag as a promoted QoS tag, the tag manager component can determine whether the service is satisfied at its current second QoS tag based at least in part on the information relating to the respective performance indicator values of the respective performance indicators associated with the service and/or the second QoS tag, and the respective threshold performance indicator values associated with the respective performance indicators, the service, and/or the second QoS tag. For instance, with regard to each such service, the tag manager component can determine whether the respective performance indicator values satisfy the corresponding (e.g., applicable or associated) respective threshold performance indicator values, based at least in part on the results of comparing the respective threshold performance indicator values to the corresponding respective threshold performance indicator values. In certain embodiments, the tag manager component can analyze or query the service performance table relating to the QoS tags and services, which can be generated based at least in part on the respective performance indicator values and the corresponding (e.g., applicable or associated) respective threshold performance indicator values, and, from the analysis or querying of the service performance table, can determine whether the service is satisfied at its current second QoS tag, such as described herein.

At 804, with regard to each service (e.g., each service that has the second QoS tag as a promoted QoS tag), in response to determining that the service is not satisfied (e.g., is degraded) at the second (e.g., promoted) QoS tag, a lowest higher QoS tag (e.g., a third QoS tag) that can satisfy the desired network performance associated with the service can be determined based at least in part on an analysis of information relating to the respective groups of performance indicators associated with the respective QoS tags. For instance, based at least in part on an analysis of information relating to the respective groups of performance indicators associated with the respective QoS tags (e.g., analysis of the service performance table relating to QoS tags and services, and/or the respective groups of performance indicators themselves in relation to the respective groups of threshold performance indicator values), with regard to each service (e.g., each service that has the second QoS tag as a promoted QoS tag) determined to not be satisfied at its current QoS tag, the tag manager component can determine the lowest higher QoS tag (e.g., a higher QoS tag than the second QoS tag that can be the lowest higher QoS level) that can satisfy (e.g., can meet or exceed; can be at or greater than) the desired network performance associated with the service such that the respective threshold performance indicator values associated with such lowest QoS tag can satisfy the respective threshold performance indicator values associated with the service. The lowest higher QoS tag can be higher (e.g., can have a higher QoS level or priority level) than the second QoS tag, but can be lower (e.g., can have a lower QoS level or priority level) than other higher QoS tags that also can satisfy the desired network performance associated with the service.

With regard to each service (e.g., each service that has the second QoS tag as a promoted QoS tag) that is determined to not be satisfied at its current second QoS tag, at 806, a determination can be made regarding whether assignment of the third QoS tag (e.g., the lowest higher QoS tag that can satisfy the desired network performance associated with the service) to the service is banned (e.g., currently banned for a defined time period). For instance, the tag manager component can determine whether assignment of the third QoS tag (e.g., the lowest higher QoS tag that can satisfy the desired network performance associated with the service) to the service is subject to a ban for a defined time period that is still in place (e.g., that has not yet expired), such as described herein.

With regard to each service (e.g., each service that has the second QoS tag as a promoted QoS tag) that is determined to not be satisfied at its current second QoS tag, if it is determined that assignment of the third QoS tag to the service is subject to the ban for the defined time period (which has not yet expired), at 808, a determination can be made that no adjustment to assignment of the second QoS tag to the service is to be made. For instance, with regard to the service under consideration, if the tag manager component determines that assignment of the third QoS tag to the service is subject to the ban for the defined time period (which has not yet expired), the tag manager component can determine that the third QoS tag cannot be assigned to the service, and no adjustment to the assignment of the second QoS tag to the service is to be made, at least at this time. Thereafter, the monitor component and the tag manager component can continue to monitor and evaluate network performance with respect to each of the services, such as described herein.

With regard to each service (e.g., each service that has the second QoS tag as a promoted QoS tag) that is determined to not be satisfied at its current second QoS tag, if, instead, at reference numeral 806, it is determined that the assignment of the third QoS tag to the service is not subject to a ban (at that time), at 810, a determination can be made that the QoS tag assignment for the service can be adjusted from the second QoS tag associated with a second QoS level to the third QoS tag associated with a third QoS level that can be higher than the second QoS level. For instance, if the tag manager component determines that the assignment of the third QoS tag to the service is not subject to a ban (at that time), the tag manager component can determine that the assignment for the service can be adjusted from the second QoS tag associated with the second QoS level to the third (e.g., higher or lowest higher) QoS tag associated with the third QoS level, and accordingly, can adjust the assignment for the service from the second QoS tag to the QoS tag. At this point, the monitor component and the tag manager component can continue to monitor and evaluate network performance with respect to each of the services, such as described herein.

Referring again to reference numeral 802, with regard to each service (e.g., each service that has the second QoS tag as a promoted QoS tag), if, instead, at reference numeral 802, it is determined that the service is satisfied at the second QoS tag (e.g., with the second QoS tag assigned to such service), at 812, a determination can be made regarding whether the service would be satisfied at the first QoS tag (e.g., the original QoS tag initially assigned to the service) based at least in part on the respective performance indicator values associated with the first QoS tag and the respective threshold performance indicator values associated with (e.g., applicable to) the first QoS tag. For instance, in response to determining that the service is satisfied (e.g., is not degraded) at the second QoS tag (e.g., the promoted QoS tag currently and temporarily assigned to such service), the tag manager component can compare the respective performance indicator values associated with the first QoS tag with the respective threshold performance indicator values associated with the first QoS tag, and, based at least in part on the results of such comparison, can determine whether one or more of the respective performance indicator values fail to satisfy one or more of the corresponding respective threshold performance indicator values. If there is such a failure to satisfy, that can indicate that the service would not be satisfied at the first QoS tag, and, alternatively, if there is no such a failure to satisfy, that can indicate that the service would be satisfied at the first QoS tag. In certain embodiments, the tag manager component can analyze or query the service performance table relating to the QoS tags and services, which can be generated based at least in part on the respective performance indicator values and the corresponding (e.g., applicable or associated) respective threshold performance indicator values associated with the first QoS tag, and, from the analysis or querying of the service performance table, can determine whether the service would be satisfied at the first QoS tag, such as described herein.

With regard to each service (e.g., each service that has the second QoS tag as a promoted QoS tag), if it is determined that the service would not be satisfied at the first QoS tag, at 814, a determination can be made that no adjustment to the assignment of the second QoS tag to the service is to be made, at least at this time. For instance, with regard to the service under consideration, if (e.g., based at least in part on the comparison results or analysis of the service performance table) the tag manager component determines that the service would not be satisfied if the first QoS tag (e.g., original QoS tag) was assigned to the service, the tag manager component can determine that no adjustment is to be made to the assignment of the second (e.g., promoted) QoS tag to the service, at least at this time. Thereafter, the monitor component and the tag manager component can continue to monitor and evaluate network performance with respect to each of the services, such as described herein.

If, instead, at reference numeral 812, it is determined that the service would be satisfied at the first QoS tag, at 816, a determination can be made that the QoS tag assignment for the service can be adjusted from the second QoS tag associated with a second QoS level to the first QoS tag associated with the first QoS level that is lower than the second QoS level. For instance, if the tag manager component determines that the service would be satisfied if the first QoS tag was assigned to the service, the tag manager component can determine that the assignment for the service can be adjusted from the second QoS tag associated with the second QoS level to the first (e.g., original and/or lower) QoS tag associated with the first QoS level, and accordingly, can adjust the assignment for the service from the second QoS tag to the first QoS tag. At this point, the monitor component and the tag manager component can continue to monitor and evaluate network performance with respect to each of the services, such as described herein.

FIG. 9 depicts a flow chart of an example method 900 that can desirably (e.g., automatically, dynamically, efficiently, suitably, enhancedly, or optimally) manage QoS tagging associated with services, including managing adjustment of a QoS tag assignment associated with a service(s), including determining whether to demote the service(s) to its lower original QoS tag from a higher and/or promoted QoS tag, and temporarily ban the service(s) from having its QoS tag assignment changed from the original lower QoS tag to the higher and/or promoted QoS tag, in accordance with various aspects and embodiments of the disclosed subject matter. The method 900 can be employed by, for example, a system (e.g., the network monitoring system) comprising the network monitor component, which can comprise the monitor component, the tag manager component, the processor component, the data store, and/or other components. In some embodiments, the method 900 can proceed from reference point A, wherein reference point A can stem from the method 700 of FIG. 7, as described herein.

At 902, a determination can be made that a second service associated with a second QoS tag of a second QoS tag level is degraded based at least in part on the information relating to respective performance indicator values of respective performance indicators of the group of performance indicators associated with the second service and/or the second QoS tag associated with the second service, and the respective threshold performance indicator values associated with the respective performance indicators, the second service, and/or the second QoS tag, wherein the second QoS tag can be an original and higher priority QoS tag associated with the second and higher priority service. In some embodiments, with regard to the second service, the tag manager component can determine that the second service is degraded based at least in part on the information relating to the respective performance indicator values of the respective performance indicators associated with the second service and/or the second QoS tag, and the respective threshold performance indicator values associated with the respective performance indicators, the second service, and/or the second QoS tag. For instance, with regard to the second service, the tag manager component can determine that one or more of the respective performance indicator values fail to satisfy the one or more corresponding (e.g., applicable or associated) respective threshold performance indicator values, based at least in part on the results of comparing the respective performance indicator values to the corresponding respective threshold performance indicator values. In certain embodiments, the tag manager component can analyze or query the service performance table relating to the QoS tags and second service, which can be generated based at least in part on the respective performance indicator values and the corresponding (e.g., applicable or associated) respective threshold performance indicator values, and, from the analysis or querying of the service performance table, can determine that the second service is degraded, such as described herein.

At 904, all of the services associated (e.g., currently associated) with the second QoS tag, including a first service and the second service, can be determined based at least in part on analysis of information indicating which services are associated with QoS tags, including the second QoS tag. In response to determining that the second (e.g., higher priority) service associated with the second QoS tag at the second (e.g., higher priority) level is degraded, the tag manager component can determine all of the services, including the first service and the second service, that are associated with the second QoS tag (e.g., all of the services that currently have the second QoS tag assigned to them), based at least in part on the analysis of the information indicating which services are associated with QoS tags.

At 906, a ban (e.g., temporary ban) of the second QoS tag with respect to any services that are not originally associated with the second QoS tag can be initiated. For instance, the tag manager component can initiate, implement, and/or execute the ban, which can be a temporary ban for a defined time period (e.g., a defined amount of time), with respect to any services that are that are not originally associated with the second QoS tag. As a result, the second (e.g., higher priority) service, which was originally assigned the second (e.g., higher priority) QoS tag, and any other service that also was originally assigned the second QoS tag, will not be subject to the ban, however, any other lower priority service, such as the first service, can be subject to the ban for the defined time period, wherein the first service can be a lower priority service that originally had a first and lower priority QoS tag at a first and lower priority QoS level before its tag assignment had been adjusted to promote it to the second QoS tag.

At 908, with regard to each service currently associated with the second QoS tag, a determination can be made regarding whether the service is currently associated with its original QoS tag. For instance, with regard to each service, including the first service and the second service, currently associated with (e.g., currently assigned with) the second QoS tag, the tag manager component can determine whether such service is currently associated with its original QoS tag (e.g., a determination whether the second QoS tag is the tag originally assigned to such service), or whether there had been a QoS tag promotion to assign the second QoS tag to such service, which had been associated with a lower priority QoS tag, such as the first QoS tag.

With regard to each service currently associated with the second QoS tag, if it is determined that such service (e.g., second service) is currently associated with its original QoS tag, with such tag being the second QoS tag, at 910, a determination can be made that the tag assignment for such service (e.g., second service) can remain at its original QoS tag (e.g., second QoS tag) and such service is not subject to the ban. For instance, with regard to each of the services currently associated with the second QoS tag, if the tag manager component determines that the service, such as, for example, the second service, is currently associated with its original QoS tag, with such tag being the second QoS tag, the tag manager component can determine that the tag assignment for such service (e.g., second service) can remain at its original QoS tag (e.g., second QoS tag at the second and higher priority QoS level), and such service is not subject to the ban implemented with respect to the second QoS tag.

Referring again to reference numeral 908, if, instead, at 908, with regard to each service currently associated with the second QoS tag, it is determined that such service (e.g., first service) is not currently associated with its original QoS tag (e.g., first QoS tag of a first and lower priority QoS level), at 912, a determination can be made that the QoS tag assignment for the service (e.g., first service) not currently associated with its original QoS tag can be adjusted from the second QoS tag associated with a second QoS level to the original QoS tag (e.g., first QoS tag) associated with the lower QoS level (e.g., the first QoS level) that is lower than the second QoS level of the second QoS tag. For instance, with regard to each service currently associated with the second QoS tag, if the tag manager component determines that such service (e.g., first service) is not currently associated with its original QoS tag, the tag manager component can adjust (e.g., modify, change, or adapt) the assignment for the service from the second (e.g., higher and/or promoted) QoS tag associated with the second QoS level to the first (e.g., original and/or lower) QoS tag associated with the first QoS level. At this point, the monitor component and the tag manager component can continue to monitor and evaluate network performance with respect to each of the services, such as described herein.

Figure 10:
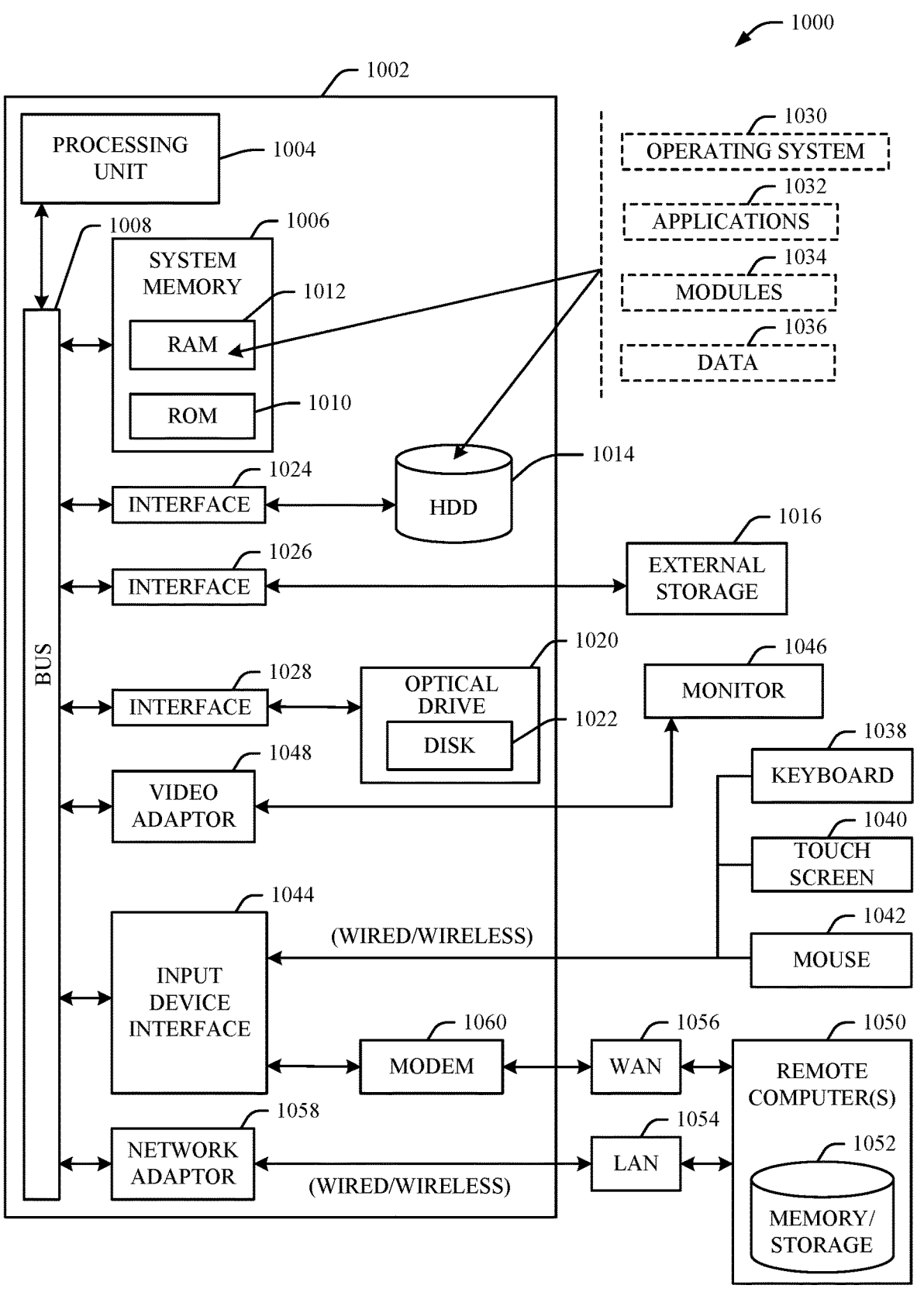
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, user equipment (UE), communication network, core network, base station service, network monitor component, monitor component, tag manager component, test endpoint node, tag configuration component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
determining, by a system comprising at least one processor, respective network performance levels associated with respective quality of service tags based on respective network responses of network equipment to respective test messages associated with the respective quality of service tags, wherein the respective quality of service tags are associated with respective services and comprise a first quality of service tag and a second quality of service tag, wherein the first quality of service tag is associated with a first service and a second service, and wherein the second service was previously assigned to the second quality of service tag;

based on the respective network performance levels associated with the respective quality of service tags, determining, by the system, whether to adjust a quality of service tag assignment for the second service from the first quality of service tag of a first quality of service level to the second quality of service tag of a second quality of service level that is lower than the first quality of service level, wherein the respective network performance levels comprise a network performance level associated with the first quality of service tag; and in response to determining that the network performance level associated with the first quality of service tag and the first service does not satisfy a defined threshold network performance level associated with the first service, and in response to determining that the second quality of service tag was previously assigned to the second service:
determining, by the system, that the quality of service tag assignment for the second service is to be adjusted from the first quality of service tag to the second quality of service tag, and
prohibiting, by the system, for a defined time period, the quality of service tag assignment for the second service from being adjusted or promoted from the second quality of service tag to the first quality of service tag.

2. The method of claim 1, wherein the prohibiting for the defined time period is initiated at a first time, wherein the defined threshold network performance level associated with the first service is a first defined threshold network performance level, wherein the respective network performance levels comprise a first network performance level associated with the first quality of service tag and a second network performance level associated with the second quality of service tag, and wherein the method further comprises:
at a second time subsequent to the first time, and in response to determining that the second network performance level associated with the second quality of service tag does not satisfy a second defined threshold network performance level associated with the second service, determining, by the system, that the first quality of service tag of the first quality of service level is able to satisfy the second defined threshold network performance level based on the first network performance level associated with the first quality of service tag;
determining, by the system, whether the second service is subject to a prohibition, for the defined time period, from having the quality of service tag assignment for the second service adjusted from the second quality of service tag to the first quality of service tag; and
in response to determining that the second service is not subject to the prohibition at the second time, adjusting, by the system, the quality of service tag assignment for the second service from the second quality of service tag of the second quality of service level to the first quality of service tag of the first quality of service level, wherein, during a subsequent communication of data packets associated with the second service, the first quality of service tag is associated with the data packets communicated via a transport layer associated with the network equipment, and wherein the network equipment comprises at least one of core network equipment of a core network or a base station associated with the core network.

3. The method of claim 2, wherein the determining that the first quality of service tag of the first quality of service level is able to satisfy the second defined threshold network performance level comprises determining that the first quality of service tag of the first quality of service level is a lowest quality of service tag that is able to satisfy the second defined threshold network performance level, as compared to other quality of service tags of the respective quality of service tags, based on the respective network performance levels associated with the respective quality of service tags.

4. The method of claim 2, wherein the second defined threshold network performance level associated with the second service is, relates to, corresponds to, or is determined as a function of service level agreement information representative of a service level agreement associated with the second service.

5. The method of claim 1, wherein the defined threshold network performance level associated with the first service is a first defined threshold network performance level, wherein the respective network performance levels comprise a first network performance level associated with the first quality of service tag and a second network performance level associated with the second quality of service tag, and wherein the method further comprises:

determining, by the system, that the first network performance level satisfies a second defined threshold network performance level associated with a third service; and determining, by the system, whether the second network performance level is able to satisfy the second defined threshold network performance level associated with the third service.

6. The method of claim 5, wherein the quality of service tag assignment for the second service is a first quality of service assignment, wherein a second quality of service tag assignment for the third service is the first quality of service tag, and wherein the method further comprises:

in response to determining that the second quality of service tag was previously assigned to the third service, and in response to determining that the second network performance level is able to satisfy the second defined threshold network performance level associated with the third service, adjusting, by the system, the second quality of service tag assignment for the third service from the first quality of service tag of the first quality of service level to the second quality of service tag of the second quality of service level.

7. The method of claim 5, further comprising:

in response to determining that the second network performance level is not able to satisfy the second defined threshold network performance level associated with the third service, determining, by the system, that the second quality of service tag assignment for the third service is not to be adjusted from the first quality of service tag of the first quality of service level to the second quality of service tag of the second quality of service level.

8. The method of claim 1, further comprising:

determining, by the system, that the network performance level associated with the first quality of service tag and the first service does not satisfy the defined threshold network performance level associated with the first service;

determining, by the system, a portion of the respective services that is associated with the first quality service tag, wherein the portion of the respective services comprises the first service and the second service, and wherein the first quality of service tag was previously assigned to the first service;

determining, by the system, that the first quality of service tag is to remain assigned to the first service based on determining that the first quality of service tag was previously assigned to the first service; and determining, by the system, that the quality of service tag assignment for the second service is to be adjusted from the first quality of service tag of the first quality of service level to the second quality of service tag of the second quality of service level based on determining that the second quality of service tag was previously assigned to the second service.

9. The method of claim 1, further comprising:

initiating, by the system, closed-loop monitoring of the respective network performance levels associated with the respective quality of service tags and respective services, comprising the first service and the second service, to facilitate determining whether any of the respective network performance levels do not satisfy respective defined threshold network performance levels associated with the respective quality of service tags and the respective services.

10. The method of claim 1, further comprising:

communicating, by the system, respective test signals associated with the respective quality of service tags and the respective services to a base station associated with a core network and to core network equipment of the core network, wherein, in response to the respective test signals the network equipment sends respective test messages associated with the respective quality of service tags and the respective services to facilitate generating the respective network responses associated with the respective quality of service tags and the respective services, and wherein the network equipment comprises the base station or the core network equipment; and receiving, by the system, the respective network responses to the respective test signals from the base station and the core network equipment.

11. The method of claim 10, wherein the respective test signals comprise two-way active measurement protocol messages.

12. The method of claim 1, further comprising:

analyzing, by the system, the respective network responses associated with the respective quality of service tags and the respective services to the respective test messages; and based on the analyzing:

determining, by the system, respective first performance indicators associated with the respective quality of service tags, the respective services, and the base station; and determining, by the system, respective second performance indicators associated with the respective quality of service tags, the respective services, and the network equipment, wherein the determining of the respective network performance levels associated with the respective quality of service tags comprises determining the respective network performance levels associated with the respective quality of service tags based on the first performance indicators or the second performance indicators.

13. The method of claim 12, wherein the respective first performance indicators or the respective second performance indicators comprise a delay, a jitter, a data throughput, a bandwidth, a data packet loss rate, or a data packet retransmission rate associated with a test message of the respective test messages.

14. A system, comprising:

at least one memory that stores computer executable components; and at least one processor that executes computer executable components stored in the at least one memory, wherein the computer executable components comprise:

a monitor that determines respective groups of performance indicators associated with respective quality of service tags based on respective network responses of network equipment associated with a core network to respective messages associated with the respective quality of service tags, wherein the respective quality of service tags are associated with respective services and comprise a first quality of service tag and a second quality of service tag, wherein the first quality of service tag is associated with a first service and a second service, and wherein the second service was originally assigned to the second quality of service tag; and a tag manager that, based on the respective groups of performance indicators associated with the respective quality of service tags, determines whether to modify a tag assignment for the second service from the first quality of service tag of a first quality of service level to the second quality of service tag of a second quality of service level that is lower than the first quality of service level, wherein the respective groups of performance indicators comprise a group of performance indicators associated with the first quality of service tag and the first service, and wherein, in response to determining that the group of performance indicators associated with the first quality of service tag and the first service does not satisfy a group of threshold performance indicators associated with the first service, and in response to determining that the second quality of service tag was originally assigned to the second service, the tag manager determines that the tag assignment for the second service is to be modified from the first quality of service tag to the second quality of service tag, and bans, for a defined time period, the tag assignment for the second service from being modified or promoted from the second quality of service tag to the first quality of service tag.

15. The system of claim 14, wherein the ban, for the defined time period, of the tag assignment from being modified or promoted from the second quality of service tag to the first quality of service tag is initiated at a first time, wherein the group of performance indicators is a first group of performance indicators, wherein the group of threshold performance indicators is a first group of threshold performance indicators, wherein the respective groups of performance indicators comprise the first group of performance indicators associated with the first quality of service tag and a second group of performance indicators associated with the second quality of service tag, wherein, at a second time subsequent to the first time, the tag manager determines that the second group of performance indicators associated with the second quality of service tag does not satisfy a second group of threshold performance indicators associated with the second service, wherein the tag manager determines that the first quality of service tag of the first quality of service level is able to satisfy the second group of threshold performance indicators based on the second group of performance indicators associated with the second quality of service tag, wherein the tag manager determines whether the second service is subject to the ban, for the defined time period, from having the second quality of service tag associated with the second service promoted to the first quality of service tag, wherein, in response to determining that the second service is not subject to the ban at the second time, the tag manager modifies the tag assignment for the second service from the second quality of service tag to the first quality of service tag, and wherein, during a subsequent communication of data packets associated with the second service, the first quality of service tag is associated with the data packets communicated via a transport layer associated with the core network.

16. The system of claim 14, wherein the ban, for the defined time period, of the tag assignment from being modified or promoted from the second quality of service tag to the first quality of service tag is initiated at a first time, wherein the respective groups of performance indicators comprise a first group of performance indicators associated with the first quality of service tag and a second group of performance indicators associated with the second quality of service tag, wherein thew group of performance indicators is the first group of performance indicators, wherein, during a time prior to the first time, the tag manager determines that the first group of performance indicators satisfies the group of threshold performance indicators associated with the first service, and determines whether the second group of performance indicators is able to satisfy a second group of threshold performance indicators associated with the second quality of service tag, and wherein one of:

in response to determining that the second quality of service tag was originally assigned to the second service, and in response to determining that the second group of performance indicators is able to satisfy the second group of threshold performance indicators associated with the second service, the tag manager modifies the tag assignment for the second service from the first quality of service tag of the first quality of service level to the second quality of service tag of the second quality of service level, or in response to determining that the second group of performance indicators is not able to satisfy the second group of threshold performance indicators associated with the service, the tag manager determines that the tag assignment for the second service is not to be modified from the first quality of service tag of the first quality of service level to the second quality of service tag of the second quality of service level.

17. The system of claim 14, wherein the tag manager determines that the group of performance indicators associated with the first quality of service tag and the first service does not satisfy the group of threshold performance indicators associated with the first service, wherein the tag manager determines a portion of the respective services that is associated with the first quality service tag, wherein the portion of the respective services comprises the first service and the second service, wherein the first quality of service tag was originally assigned to the first service, and wherein the tag manager determines that the first quality of service tag is to remain assigned to the first service based on determining that the first quality of service tag was originally assigned to the first service.

18. The system of claim 17, wherein the tag manager initiates feedback-loop monitoring of the respective groups of performance indicators associated with the respective quality of service tags and respective services, comprising the first service and the second service, to facilitate determining whether any of the respective groups of performance indicators associated with any of the respective quality of service tags and any of the respective services do not satisfy respective groups of threshold performance indicators associated with the respective quality of service tags and the respective services.

19. A non-transitory machine-readable medium, comprising executable instructions that, when executed by at least one processor, facilitate performance of operations, comprising:

determining respective groups of performance indicators associated with respective quality of service tags based on respective network responses of network equipment to respective messages associated with the respective quality of service tags, wherein the respective quality of service tags are associated with respective services and comprise a first quality of service tag and a second quality of service tag, wherein the first quality of service tag is associated with a first service and a second service, and wherein the second service was previously assigned to the second quality of service tag;

based on the respective groups of performance indicators associated with the respective quality of service tags, determining whether to alter a tag assignment for the second service from the first quality of service tag of a first quality of service level to the second quality of service tag of a second quality of service level, wherein the respective network groups of performance indicators comprise a group of performance indicators associated with the first quality of service tag and the first service; and in response to determining that the group of performance indicators associated with the first quality of service tag and the first service does not satisfy a group of threshold performance indicators associated with the first service, and in response to determining that the second quality of service tag was previously assigned to the second service:

determining that the tag assignment for the second service is to be altered from the first quality of service tag to the second quality of service tag, and restricting, for a defined time period, the tag assignment for the second service from being altered from the second quality of service tag to the first quality of service tag.

20. The non-transitory machine-readable medium of claim 19, wherein the restricting for the defined time period is initiated at a first time, wherein the second quality of service level is lower than the first quality of service level, wherein the group of performance indicators is a first group of performance indicators, wherein the group of threshold performance indicators is a first group of threshold performance indicators, wherein the respective groups of performance indicators comprise the first group of performance indicators associated with the first quality of service tag and a second group of performance indicators associated with the second quality of service tag, and wherein the operations further comprise:

at a second time that occurs more than the defined time period after the first time, and in response to determining that the second group of performance indicators associated with the second quality of service tag does not satisfy a second group of threshold performance indicators associated with the second service, determining that the second quality of service tag of the second quality of service level is able to satisfy the group of threshold performance indicators based on the second network performance level associated with the second quality of service tag;

determining whether the second service is restricted, for the defined time period, from having the second quality of service tag associated with the second service altered or promoted to the first quality of service tag; and in response to determining that the second service is not restricted at the second time, altering the tag assignment for the second service from the second quality of service tag to the first quality of service tag, wherein, during a subsequent communication of data packets associated with the second service, the first quality of service tag is associated with the data packets communicated via a transport layer associated with the network equipment.

* * * * *